US009749935B2

(12) United States Patent
Li et al.

(10) Patent No.: US 9,749,935 B2
(45) Date of Patent: Aug. 29, 2017

(54) METHODS AND APPARATUS FOR CELL SCANNING IN SYSTEM WITH LARGE NUMBER OF ANTENNAS

(71) Applicant: Samsung Electronics Co., Ltd., Suwon-si, Gyeonggi-do (KR)

(72) Inventors: Ying Li, Richardson, TX (US); Zhouyue Pi, Allen, TX (US); Sridhar Rajagopal, Plano, TX (US); Pavan Nuggehalli, Mountain View, CA (US); Shadi Abu-Surra, Plano, TX (US); Sudhir Ramakrishna, Plano, TX (US)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 681 days.

(21) Appl. No.: 13/763,411

(22) Filed: Feb. 8, 2013

(65) Prior Publication Data
US 2013/0237218 A1    Sep. 12, 2013

Related U.S. Application Data

(60) Provisional application No. 61/609,202, filed on Mar. 9, 2012.

(51) Int. Cl.
H04W 4/00        (2009.01)
H04W 48/16       (2009.01)
(Continued)

(52) U.S. Cl.
CPC ............ *H04W 48/16* (2013.01); *H04W 16/28* (2013.01); *H04W 24/08* (2013.01); *H04W 24/10* (2013.01);
(Continued)

(58) Field of Classification Search
CPC ..... H04W 24/08; H04W 24/10; H04W 72/02; H04W 72/042; H04W 72/046
(Continued)

(56) References Cited

U.S. PATENT DOCUMENTS

2002/0137538 A1*  9/2002  Chen et al. ............... 455/550
2007/0054667 A1*  3/2007  Lee et al. ................. 455/434
(Continued)

FOREIGN PATENT DOCUMENTS

KR    10-2004-0052494 A    6/2004
KR    10-2011-0004330 A    1/2011
(Continued)

OTHER PUBLICATIONS

International Search Report dated Jun. 27, 2013 in connection with International Patent Application No. PCT/KR2013/001904, 3 pages.
(Continued)

*Primary Examiner* — Charles Appiah
*Assistant Examiner* — Jaime Holliday

(57) ABSTRACT

A mobile station is configured to scan cells in a wireless network. The mobile station includes at least one antenna configured to transmit and receive wireless signals. The mobile station also includes a processor coupled to the at least one antenna, the processor configured to scan for one or more neighboring base station cells in a same frequency band as a serving base station cell using one or more receive beams. The one or more receive beams used for scanning are different than receive beams used for data communication with the serving base station cell.

24 Claims, 19 Drawing Sheets

(51) Int. Cl.
*H04W 40/24* (2009.01)
*H04W 72/04* (2009.01)
*H04W 72/02* (2009.01)
*H04W 88/06* (2009.01)
*H04W 36/08* (2009.01)
*H04W 48/20* (2009.01)
*H04W 48/18* (2009.01)
*H04W 24/08* (2009.01)
*H04W 24/10* (2009.01)
*H04W 16/28* (2009.01)

(52) U.S. Cl.
CPC .......... *H04W 36/08* (2013.01); *H04W 40/246* (2013.01); *H04W 48/18* (2013.01); *H04W 48/20* (2013.01); *H04W 72/02* (2013.01); *H04W 72/042* (2013.01); *H04W 72/046* (2013.01); *H04W 88/06* (2013.01)

(58) Field of Classification Search
USPC ........................................................ 455/434
See application file for complete search history.

(56) References Cited

U.S. PATENT DOCUMENTS

2007/0178898 A1\* 8/2007 Kim et al. ..................... 455/434
2008/0220807 A1\* 9/2008 Patel et al. .................... 455/524
2010/0296599 A1\* 11/2010 Lee et al. ...................... 375/267
2011/0111745 A1   5/2011 Li et al.
2012/0108284 A1\* 5/2012 Patel et al. .................... 455/509

FOREIGN PATENT DOCUMENTS

KR    10-2011-0019328 A    2/2011
KR    10-2011-0088382 A    8/2011

OTHER PUBLICATIONS

Written Opinion of International Searching Authority dated Jun. 27, 2013 in connection with International Patent Application No. PCT/KR2013/001904, 5 pages.

\* cited by examiner

METHODS AND APPARATUS FOR CELL SCANNING IN SYSTEM WITH LARGE NUMBER OF ANTENNAS

CROSS-REFERENCE TO RELATED APPLICATION(S) AND CLAIM OF PRIORITY

The present application claims priority to U.S. Provisional Patent Application Ser. No. 61/609,202 filed Mar. 9, 2012, entitled "CELL SCANNING IN MILLIMETER WAVE COMMUNICATIONS". The content of the above-identified patent documents is incorporated herein by reference.

TECHNICAL FIELD

The present application relates generally to wireless communication and, more specifically, to a method and apparatus for cell scanning in a system with a large number of antennas.

BACKGROUND

Wireless communication has been one of the most successful innovations in modern history. Recently, the number of subscribers to wireless communication services exceeded 5 billion and continues to grow quickly. The demand of wireless data traffic is rapidly increasing due to growing popularity among consumers and businesses of smart phones and other mobile data devices, such as tablets, "note pad" computers, net books, and eBook readers. In order to meet the high growth in mobile data traffic, improvements in radio interface efficiency and allocation of new spectrum is of paramount importance.

SUMMARY

A method for scanning cells by a mobile station in a wireless network is provided. The method includes scanning for one or more neighboring base station cells in a same frequency band as a serving base station cell using one or more receive beams. The one or more receive beams used for scanning are different than receive beams used for data communication with the serving base station cell.

An apparatus for use in a mobile station configured to scan cells in a wireless network is provided. The apparatus includes a processor configured to scan for one or more neighboring base station cells in a same frequency band as a serving base station cell using one or more receive beams. The one or more receive beams used for scanning are different than receive beams used for data communication with the serving base station cell.

A method for a serving base station to configure a mobile station to scan cells in a wireless network is provided. The method includes configuring the mobile station to scan for one or more neighboring base station cells in a same frequency band as a serving base station cell using one or more receive beams. The one or more receive beams used for scanning are different than receive beams used for data communication with the serving base station cell.

An apparatus for use in a serving base station to configure a mobile station to scan cells in a wireless network is provided. The apparatus includes a processor configured to configure the mobile station to scan for one or more neighboring base station cells in a same frequency band as a serving base station cell using one or more receive beams. The one or more receive beams used for scanning are different than receive beams used for data communication with the serving base station cell.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
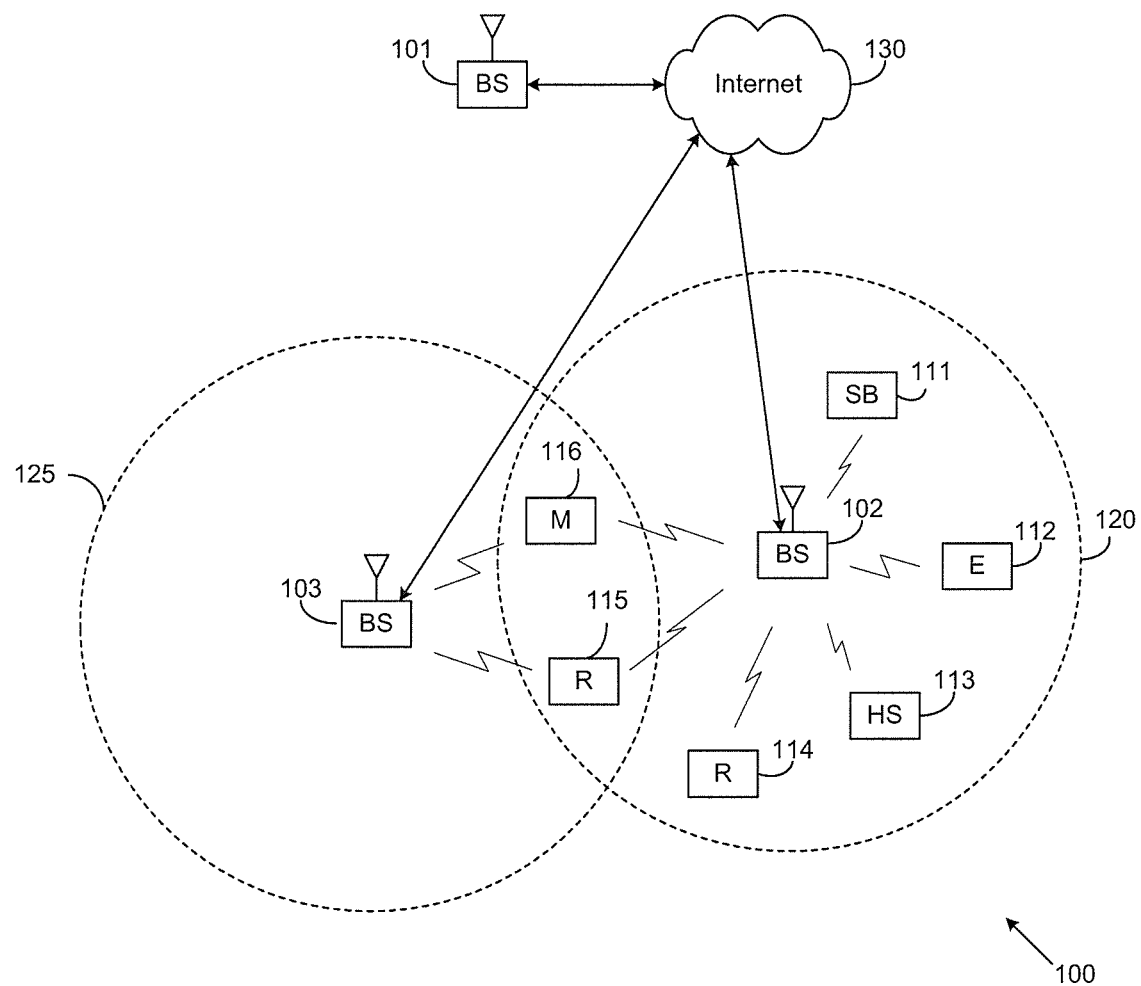
FIG. 1 illustrates a wireless communication network, according to embodiments of this disclosure.

FIGS. 1 through 20, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged wireless communication system.

Aspects, features, and advantages of the disclosure are readily apparent from the following detailed description, through illustration of a number of embodiments and implementations. The disclosure also encompasses other and different embodiments, and its several details can be modified in various obvious respects, all without departing from the spirit and scope of the disclosure.

In this disclosure, a limited number and types of base stations and mobile stations, service flows, connections, routes, or use cases may be used as examples for illustration. However, the embodiments disclosed herein are also applicable to other numbers and types of base stations, mobile stations, service flows, connections, routes, and other related use cases.

The following documents and standards descriptions are hereby incorporated into the present disclosure as if fully set forth herein: (i) F. Khan and Z. Pi., "MmWave Mobile Broadband (MMB): Unleashing the 3-300 GHz Spectrum", in Proc. Sarnoff Symposium, 2011 (hereinafter "REF1"); (ii) Z. Pi and F. Khan, "An Introduction To Millimeter-Wave Mobile Broadband Systems", IEEE Communication Magazine, June 2011 (hereinafter "REF2"); and (iii) Z. Pi and F. Khan, "System Design And Network Architecture For A Millimeter-Wave Mobile Broadband (MMB) System", in Proc. Sarnoff Symposium, 2011 (hereinafter "REF3").

The demand for wireless data traffic is rapidly increasing due to rising popularity among consumers and businesses of smart phones and other mobile data devices such as notepads, netbooks and eBook readers. In order to meet the high growth in mobile data traffic, improvements in radio interface efficiency and allocation of new spectrum is of paramount importance.

The current fourth generation wireless communication systems ("4G systems"), including LTE and Mobile WiMAX, use advanced technologies such as OFDM (Orthogonal Frequency Division Multiplexing), MIMO (Multiple Input Multiple Output), multi-user diversity, link adaptation, and the like, in order to achieve spectral efficiencies which are close to theoretical limits in terms of bps/Hz/cell. Continuous improvements in air-interface performance are being considered by introducing new techniques such as carrier aggregation, higher order MIMO, coordinated Multipoint (CoMP) transmission and relays, and the like. However, it is generally agreed that any further improvements in spectral efficiency will likely be marginal.

When spectral efficiency in terms of bps/Hz/cell cannot be improved significantly, another possibility to increase capacity is to deploy many smaller cells. However, the number of small cells that can be deployed in a geographic area can be limited due to costs involved for acquiring the new site, installing the equipment, provisioning backhaul, and so forth. In theory, to achieve a one-thousand-fold increase in capacity, the number of cells also needs to be increased by the same factor. Another drawback of very small cells is frequent handoffs which increase network signaling overhead and latency. Thus, while small cells may be a component of future wireless networks, the small cells alone are not expected to meet the capacity required to accommodate orders of magnitude increase in mobile data traffic demand in a cost effective manner.

In addition to the new technologies described above, more technologies are being explored to meet the explosive demand of mobile data. REF1, REF2, and REF3 discuss the use Millimeter-wave band (3-300 GHz spectrum) for Mobile Broadband (MMB) applications, with wide area coverage. Key advantages for these frequencies are spectrum availability and small component sizes such as antennas and other radio devices due to short wavelengths. Due to their smaller wave lengths, more millimeter wave antennas can be placed in a relative small area, thus enabling high-gain antenna in a small form factor. Larger bands can be used and higher throughput can be achieved using MMB communications compared to current 4G systems.

In certain cellular systems, a mobile station (MS) can detect a base station (BS) using one or more omni-receiving antennas or antennas with a very wide beam. These features permit the MS to easily listen to the downlink signal from the BS and detect the BS.

However, in certain newer systems with a large number of antennas or antenna arrays, such as a MMB cellular system, one of the challenges is how a mobile station can detect base stations and establish communication to get into the network, or how a mobile station can detect and monitor nearby base stations for possible handover when the mobile station is communicating to the serving base station. One reason that makes it a challenge is that a base station can send its downlink signal (e.g., a synchronization channel, reference signals) in directional beams, while the mobile station may receive information in directional beams. The transmit beams from a base station may not be always be received by the directional receive beams from a mobile station without any communication between the base station and the mobile station. Furthermore, the transmit directional beams of a nearby base station may arrive from directions that the receive directional beams may not receive, if the receive directional beams are formed to receive the serving base station's signal, which can be from different directions than the signals of the nearby neighboring base stations. This makes it difficult for a mobile station to discover base stations.

This disclosure describes methods and apparatus to enhance cell scanning and discovery in a system with a large number of antennas, e.g., millimeter wave wideband communications. Although embodiments of this disclosure are described in the context of communication with millimeter waves, the disclosed embodiments are also applicable in other communication mediums, e.g., radio waves with frequency of 3 GHz-30 GHz that exhibit properties similar to millimeter waves. In some cases, the disclosed embodiments are also applicable to electromagnetic waves with terahertz frequencies, infrared, visible light, and other optical media. For illustrative purposes, the terms "cellular band" and "millimeter wave band" are used herein, where "cellular band" refers to frequencies of approximately a few hundred megahertz to a few gigahertz, and "millimeter wave band" refers to frequencies of approximately a few tens of gigahertz to a few hundred gigahertz. One difference between the two is that the radio waves in cellular bands have less propagation loss and can provide superior coverage, but may require large antennas. On the other hand, radio waves in millimeter wave bands usually exhibit higher propagation loss but lend themselves well to high-gain antennas or antenna array designs in a small form factor.

As described above, millimeter waves typically refer to radio waves with wavelengths in the range of 1 mm-100 mm, which corresponds to a radio frequency of 3 GHz-300 GHz. As defined by ITU (International Telecommunications Union), these frequencies are also referred to as the EHF (Extremely High Frequency) band. These radio waves exhibit unique propagation characteristics. For example, compared with lower frequency radio waves, millimeter waves are often associated with higher propagation loss, have poorer ability to penetrate objects (e.g., buildings, walls, and foliage), and are more susceptible to atmosphere absorption, deflection and diffraction due to particles (e.g., rain drops) in the air. However, due to their smaller wavelengths, more millimeter wave antennas can be placed in a relatively small area, thus enabling high-gain antennas in a small form factor. In addition, due to the aforementioned perceived disadvantages, these radio waves have been less utilized than the lower frequency radio waves. Accordingly, spectrum in this band may be acquired at a lower cost.

The ITU defines frequencies in 3 GHz-30 GHz as SHF (Super High Frequency). The frequencies in the SHF band exhibit behavior similar to radio waves in the EHF band (i.e., millimeter waves), such as large propagation loss and the possibility of implementing high-gain antennas in small form factors.

Vast amounts of spectrum are available in the millimeter wave band. The millimeter wave band has been used, for example, in short range (within 10 meters) communications. However, the existing technologies in millimeter wave band are not optimized for commercial mobile communication having a wider coverage, so there is currently no significant commercial cellular system in millimeter wave band. Throughout this disclosure, mobile broadband communication systems deployed in 3-300 GHz frequencies will be referred to as millimeter-wave mobile broadband (MMB).

One system design approach is to leverage the existing technologies for mobile communication and utilize the millimeter wave channel as additional spectrum for data communication. In such a system, communication stations (including different types of mobile stations, base stations, and relay stations) communicate using both cellular bands and millimeter wave bands. The cellular bands may be in the frequency of approximately a few hundred megahertz to a few gigahertz. Compared with millimeter waves, the radio waves in these frequencies may exhibit less propagation loss, can better penetrate obstacles, and are less sensitive to non-line-of-sight (NLOS) communication links or other impairments such as absorption by oxygen, rain, and other particles in the air. Therefore, it may be advantageous to transmit certain important control channel signals via the cellular radio frequencies, while utilizing the millimeter waves for high data rate communication.

In another system design approach, both stand-alone mobile communications and control/data communications may occur in MMB. The communications in MMB may coexist with current cellular systems (e.g., 4G, 3G, and the like). A mobile station can hand over to an existing 3G or 4G cellular system in situations where the mobile station is in a coverage "hole" in the MMB system, or the signal strength from the base stations in MMB is not strong enough. Base stations in MMB include different sizes with an overlay hierarchical network structure, where small cells can be overlaid by large cells.

In systems with directional antennas or antenna arrays, such as a MMB cellular system, one of the challenges is how to scan the cells, especially when there are system constraints, such as in systems where some beams cannot be formed or used at the same time due to physical device constraints. Embodiments of this disclosure address the issues of how to manage beams in a system with directional antennas or antenna arrays.

The embodiments disclosed herein primarily describe communication between base stations and mobile stations (e.g., base station to mobile station transmission). Those skilled in the art will recognize that the disclosed embodiments are also applicable for communications between base stations (e.g., base station to base station transmission), and for communications between mobile stations (e.g., mobile station to mobile station communication). The embodiments disclosed herein are applicable for communication systems with large number of antennas, such as systems in MMB, RF band, and the like.

FIG. 1 illustrates a wireless communication network, according to embodiments of this disclosure. The embodiment of wireless communication network 100 illustrated in FIG. 1 is for illustration only. Other embodiments of the wireless communication network 100 could be used without departing from the scope of this disclosure.

In the illustrated embodiment, the wireless communication network 100 includes base station (BS) 101, base station (BS) 102, base station (BS) 103, and other similar base stations (not shown). Base station 101 is in communication with base station 102 and base station 103. Base station 101 is also in communication with Internet 130 or a similar IP-based system (not shown).

Base station 102 provides wireless broadband access (via base station 101) to Internet 130 to a first plurality of subscriber stations (also referred to herein as mobile stations) within coverage area 120 of base station 102. Throughout this disclosure, the term mobile station (MS) is interchangeable with the term subscriber station (SS) and the term user equipment (UE). The first plurality of subscriber stations includes subscriber station 111, which may be located in a small business (SB), subscriber station 112, which may be located in an enterprise (E), subscriber station 113, which may be located in a Wi-Fi hotspot (HS), subscriber station 114, which may be located in a first residence (R), subscriber station 115, which may be located in a second residence (R), and subscriber station 116, which may be a mobile device (M), such as a cell phone, a wireless laptop, a wireless PDA, or the like.

Base station 103 provides wireless broadband access (via base station 101) to Internet 130 to a second plurality of subscriber stations within coverage area 125 of base station 103. The second plurality of subscriber stations includes subscriber station 115 and subscriber station 116. In an exemplary embodiment, base stations 101-103 may communicate with each other and with subscriber stations 111-116 using OFDM or OFDMA techniques.

Each base station 101-103 can have a globally unique base station identifier (BSID). A BSID is often a MAC (media access control) ID. Each base station 101-103 can have multiple cells (e.g., one sector can be one cell), each with a physical cell identifier, or a preamble sequence, which is often carried in the synchronization channel.

While only six subscriber stations are depicted in FIG. 1, it is understood that the wireless communication network 100 may provide wireless broadband access to additional subscriber stations. It is noted that subscriber station 115 and subscriber station 116 are located on the edges of both coverage area 120 and coverage area 125. Subscriber station 115 and subscriber station 116 each communicate with both base station 102 and base station 103 and may be said to be operating in handoff mode, as known to those of skill in the art.

Subscriber stations 111-116 may access voice, data, video, video conferencing, and/or other broadband services via Internet 130. For example, subscriber station 116 may be any of a number of mobile devices, including a wireless-enabled laptop computer, personal data assistant, notebook, handheld device, or other wireless-enabled device. Subscriber stations 114 and 115 may be, for example, a wireless-enabled personal computer (PC), a laptop computer, a gateway, or another device.

Figure 2A:
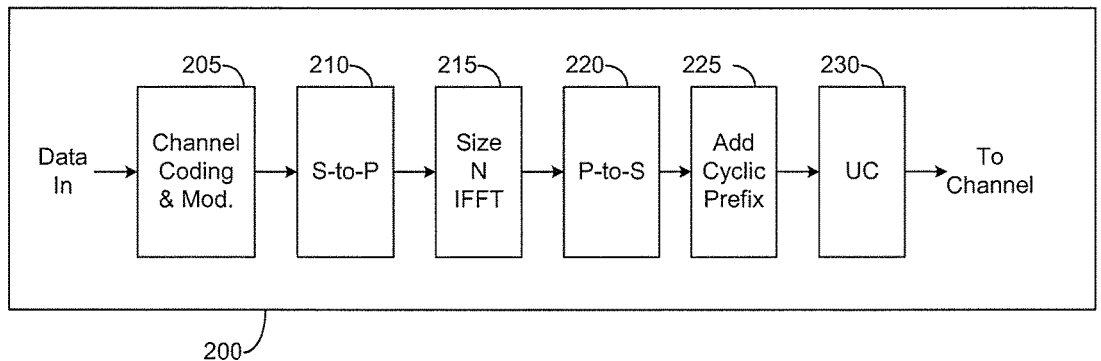
FIG. 2A is a high-level diagram of an orthogonal frequency division multiple access (OFDMA) or millimeter wave transmit path, according to embodiments of this disclosure.
Figure 2B:
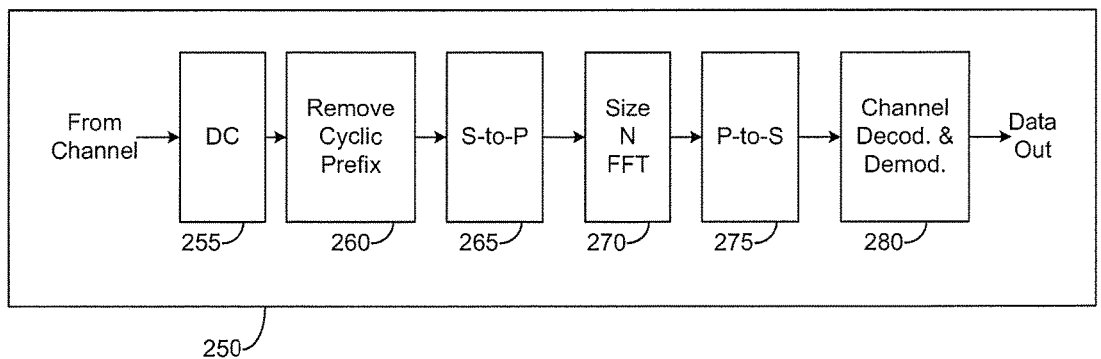
FIG. 2B is a high-level diagram of an OFDMA or millimeter wave receive path, according to embodiments of this disclosure.

FIG. 2A is a high-level diagram of an orthogonal frequency division multiple access (OFDMA) or millimeter wave transmit path, according to embodiments of this disclosure. FIG. 2B is a high-level diagram of an OFDMA or millimeter wave receive path, according to embodiments of this disclosure. In FIGS. 2A and 2B, the transmit path 200 may be implemented, e.g., in base station (BS) 102 and the receive path 250 may be implemented, e.g., in a subscriber station, such as subscriber station 116 of FIG. 1. It will be understood, however, that the receive path 250 could be implemented in a base station (e.g. base station 102 of FIG. 1) and the transmit path 200 could be implemented in a subscriber station. All or part of the transmit path 200 and the receive path 250 may comprise, or be comprised of, one or more processors.

Transmit path 200 comprises channel coding and modulation block 205, serial-to-parallel (S-to-P) block 210, Size N Inverse Fast Fourier Transform (IFFT) block 215, parallel-to-serial (P-to-S) block 220, add cyclic prefix block 225, up-converter (UC) 230. Receive path 250 comprises down-converter (DC) 255, remove cyclic prefix block 260, serial-to-parallel (S-to-P) block 265, Size N Fast Fourier Transform (FFT) block 270, parallel-to-serial (P-to-S) block 275, channel decoding and demodulation block 280.

At least some of the components in FIGS. 2A and 2B may be implemented in software while other components may be implemented by configurable hardware or a mixture of software and configurable hardware. In particular, it is noted that the FFT blocks and the IFFT blocks described in this disclosure document may be implemented as configurable software algorithms, where the value of Size N may be modified according to the implementation.

Furthermore, although this disclosure is directed to an embodiment that implements the Fast Fourier Transform and the Inverse Fast Fourier Transform, this is by way of illustration only and should not be construed to limit the scope of the disclosure. It will be appreciated that in an alternate embodiment of the disclosure, the Fast Fourier Transform functions and the Inverse Fast Fourier Transform functions may easily be replaced by Discrete Fourier Transform (DFT) functions and Inverse Discrete Fourier Transform (IDFT) functions, respectively. It will be appreciated that for DFT and IDFT functions, the value of the N variable may be any integer number (i.e., 1, 2, 3, 4, etc.), while for FFT and IFFT functions, the value of the N variable may be any integer number that is a power of two (i.e., 1, 2, 4, 8, 16, etc.).

In transmit path 200, channel coding and modulation block 205 receives a set of information bits, applies coding (e.g., LDPC coding) and modulates (e.g., Quadrature Phase Shift Keying (QPSK) or Quadrature Amplitude Modulation (QAM)) the input bits to produce a sequence of frequency-domain modulation symbols. Serial-to-parallel block 210 converts (i.e., de-multiplexes) the serial modulated symbols to parallel data to produce N parallel symbol streams where N is the IFFT/FFT size used in BS 102 and SS 116. Size N IFFT block 215 then performs an IFFT operation on the N parallel symbol streams to produce time-domain output signals. Parallel-to-serial block 220 converts (i.e., multiplexes) the parallel time-domain output symbols from Size N IFFT block 215 to produce a serial time-domain signal. Add cyclic prefix block 225 then inserts a cyclic prefix to the time-domain signal. Finally, up-converter 230 modulates (i.e., up-converts) the output of add cyclic prefix block 225 to RF frequency for transmission via a wireless channel. The signal may also be filtered at baseband before conversion to RF frequency.

The transmitted RF signal arrives at SS 116 after passing through the wireless channel and reverse operations to those at BS 102 are performed. Down-converter 255 down-converts the received signal to baseband frequency and remove cyclic prefix block 260 removes the cyclic prefix to produce the serial time-domain baseband signal. Serial-to-parallel block 265 converts the time-domain baseband signal to parallel time domain signals. Size N FFT block 270 then performs an FFT algorithm to produce N parallel frequency-domain signals. Parallel-to-serial block 275 converts the parallel frequency-domain signals to a sequence of modulated data symbols. Channel decoding and demodulation block 280 demodulates and then decodes the modulated symbols to recover the original input data stream.

Each of base stations 101-103 may implement a transmit path that is analogous to transmitting in the downlink to subscriber stations 111-116 and may implement a receive path that is analogous to receiving in the uplink from subscriber stations 111-116. Similarly, each one of subscriber stations 111-116 may implement a transmit path corresponding to the architecture for transmitting in the uplink to base stations 101-103 and may implement a receive path corresponding to the architecture for receiving in the downlink from base stations 101-103.

In one embodiment of this disclosure, a base station (BS) can have one or multiple cells, and each cell can have one or multiple antenna arrays, where each array within a cell can have different frame structures, e.g., different uplink and downlink ratios in a time division duplex (TDD) system. Multiple TX/RX (transmitting/receiving) chains can be applied in one array, or in one cell. One or multiple antenna arrays in a cell can have the same downlink control channel (e.g., synchronization channel, physical broadcast channel, and the like) transmission, while the other channels (e.g., data channel) can be transmitted in the frame structure specific to each antenna array.

The base station can use one or more antennas or antenna arrays to carry out beam forming. Antenna arrays can form beams having different widths (e.g., wide beam, narrow beam, etc.). Downlink control channel information, broadcast signals and messages, and broadcast data channels and control channels can be transmitted, e.g., in wide beams. A wide beam may include a single wide beam transmitted at one time, or a sweep of narrow beams at sequential times. Multicast and unicast data and control signals and messages can be transmitted, e.g., in narrow beams.

Identifiers of cells can be carried in the synchronization channel. Identifiers of arrays, beams, and the like, can be implicitly or explicitly carried in the downlink control channels (e.g., synchronization channel, physical broadcast channel, and the like). These channels can be sent over wide beams. By acquiring these channels, the mobile station (MS) can detect the identifiers.

A mobile station (MS) can also use one or more antennas or antenna arrays to carry out beam forming. As in BS antenna arrays, antenna arrays at the MS can form beams with different widths (e.g., wide beam, narrow beam, etc.). Broadcast signals and messages, and broadcast data channels and control channels can be transmitted, e.g., in wide beams. Multicast and unicast data and control signals and messages can be transmitted, e.g., in narrow beams.

The beams can be in various shapes, or can have various beam patterns. The beam shapes or the beam patterns can be regular or irregular, e.g., pencil beam shape, cone beam shape, irregular main lobe with side lobes, and the like. The beams can be formed, transmitted, received, using, e.g., the transmit paths and the receive paths in FIGS. 3A through 3D.

Figure 3A:
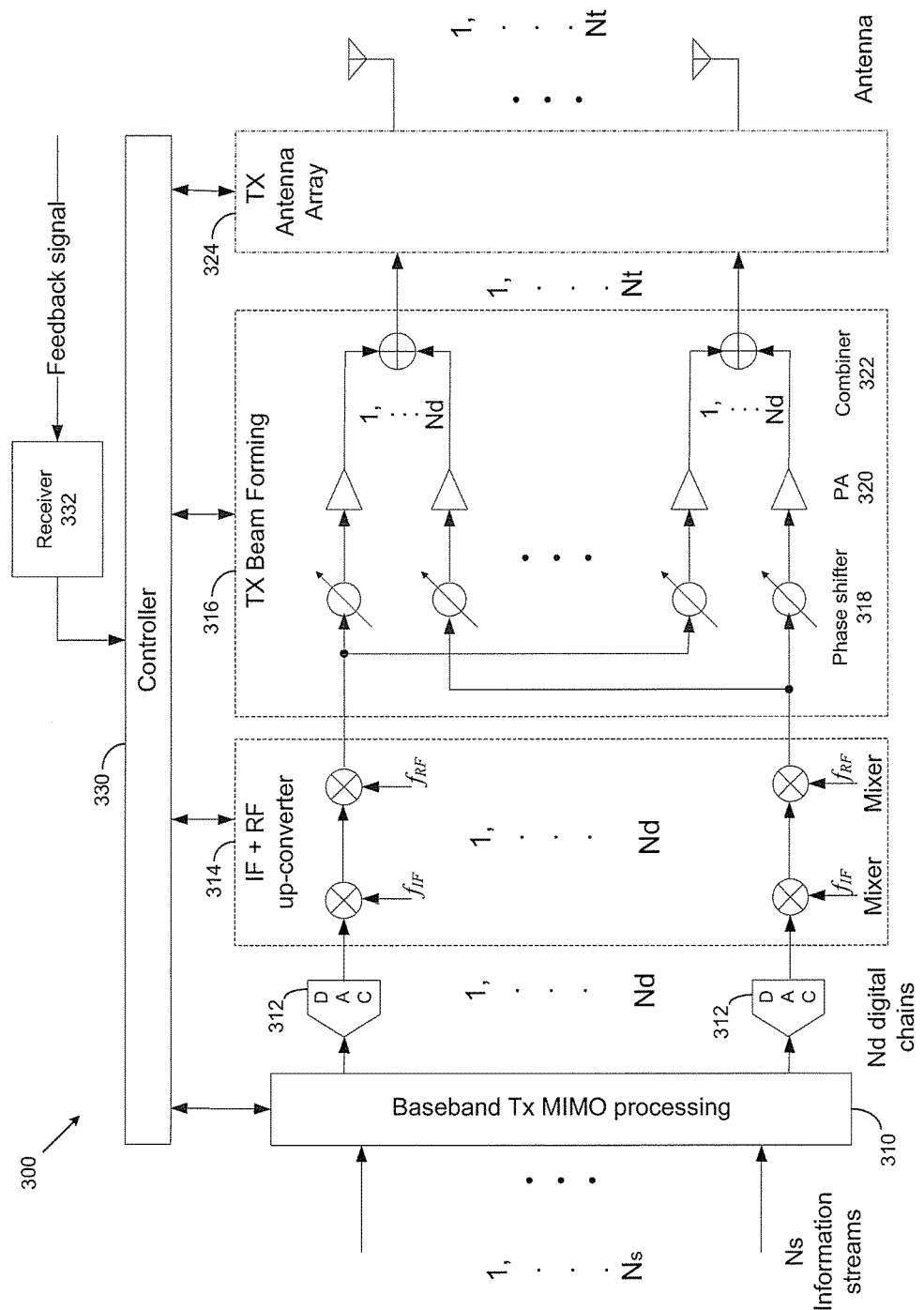
FIG. 3A illustrates a transmit path for multiple input multiple output (MIMO) baseband processing and analog beam forming with a large number of antennas, according to embodiments of this disclosure.

FIG. 3A illustrates a transmit path for multiple input multiple output (MIMO) baseband processing and analog beam forming with a large number of antennas, according to embodiments of this disclosure. The transmit path 300 includes a beam forming architecture in which all of the signals output from baseband processing are fully connected to all the phase shifters and power amplifiers (PAs) of the antenna array.

As shown in FIG. 3A, Ns information streams are processed by a baseband processor (not shown), and input to the baseband TX MIMO processing block 310. After the baseband TX MIMO processing, the information streams are converted at a digital and analog converter (DAC) 312, and further processed by an interim frequency (IF) and radio frequency (RF) up-converter 314, which converts the baseband signal to the signal in RF carrier band. In some embodiments, one information stream can be split to I (in-phase) and Q (quadrature) signals for modulation. After the IF and RF up-converter 314, the signals are input to a TX beam forming module 316.

FIG. 3A shows one possible architecture for the beam forming module 316, where the signals are fully connected to all the phase shifters and power amplifiers (PAs) of the transmit antennas. Each of the signals from the IF and RF up-converter 314 can go through one phase shifter 318 and one PA 320, and via a combiner 322, all the signals can be combined to contribute to one of the antennas of the TX antenna array 324. In FIG. 3A, there are Nt transmit antennas in the TX array 324. Each antenna can have one or multiple antenna elements. Each antenna transmits the signal over the air. A controller 330 can interact with the TX modules including the baseband processor, IF and RF up-converter 314, TX beam forming module 316, and TX antenna array module 324. A receiver module 332 can receive feedback signals and the feedback signals can be input to the controller 330. The controller 330 can process the feedback signal and adjust the TX modules.

Figure 3B:
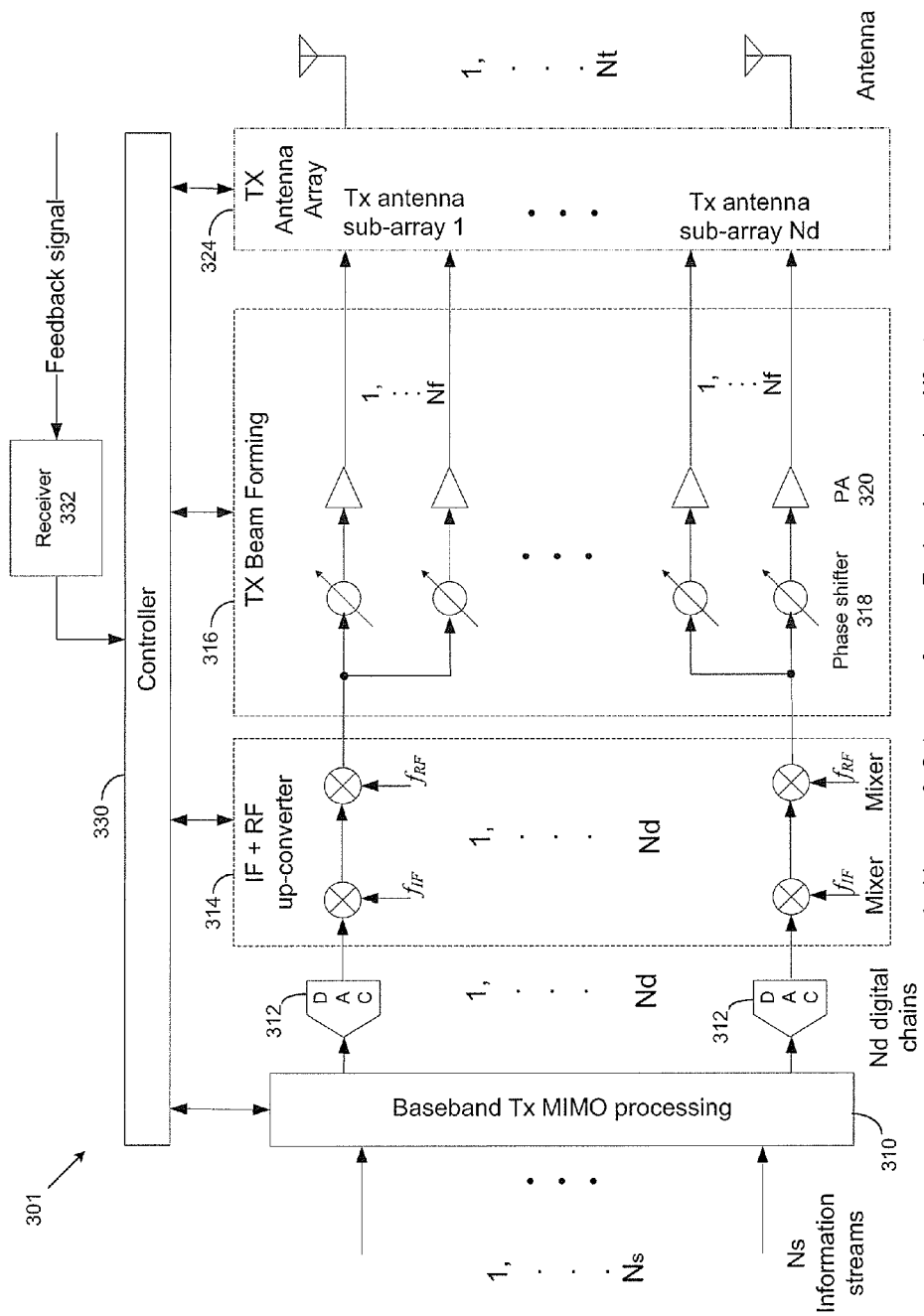
FIG. 3B illustrates another transmit path for MIMO baseband processing and analog beam forming with a large number of antennas, according to embodiments of this disclosure.

FIG. 3B illustrates another transmit path for MIMO baseband processing and analog beam forming with a large number of antennas, according to embodiments of this disclosure. The transmit path 301 includes a beam forming architecture in which a signal output from baseband processing is connected to the phase shifters and power amplifiers (PAs) of a sub-array of the antenna array. The transmit path 301 is similar to the transmit path 300 of FIG. 3A, except for differences in the beam forming module 316.

As shown in FIG. 3B, the signal from the baseband is processed through the IF and RF up-converter 314, and is input to the phase shifters 318 and power amplifiers 320 of a sub-array of the antenna array 324, where the sub-array has Nf antennas. For the Nd signals from baseband processing (e.g., the output of the MIMO processing), if each signal goes to a sub-array with Nf antennas, the total number of transmitting antennas Nt should be Nd*Nf. The transmit path 301 includes an equal number of antennas for each sub-array. However, the disclosure is not limited thereto. Rather, the number of antennas for each sub-array need not be equal across all sub-arrays.

The transmit path 301 includes one output signal from the MIMO processing as the input to the RF processing with one sub-array of antennas. However, this disclosure is not limited thereto. Rather, one or multiple signals out of the Nd signals from base band processing (e.g., the output of the MIMO processing) can be the inputs to one of the sub-arrays. When multiple output signals from the MIMO processing are as the inputs to one of the sub-arrays, each of the multiple output signals from the MIMO processing can be connected to part of or all of the antennas of the sub-array. For example, the RF and IF signal processing with each of the sub-array of antennas can be the same as the processing with the array of antennas as in FIG. 3A, or any type of the RF and IF signal processing with an array of antennas. The process related to one sub-array of the antennas may be referred to as one "RF chain".

Figure 3C:
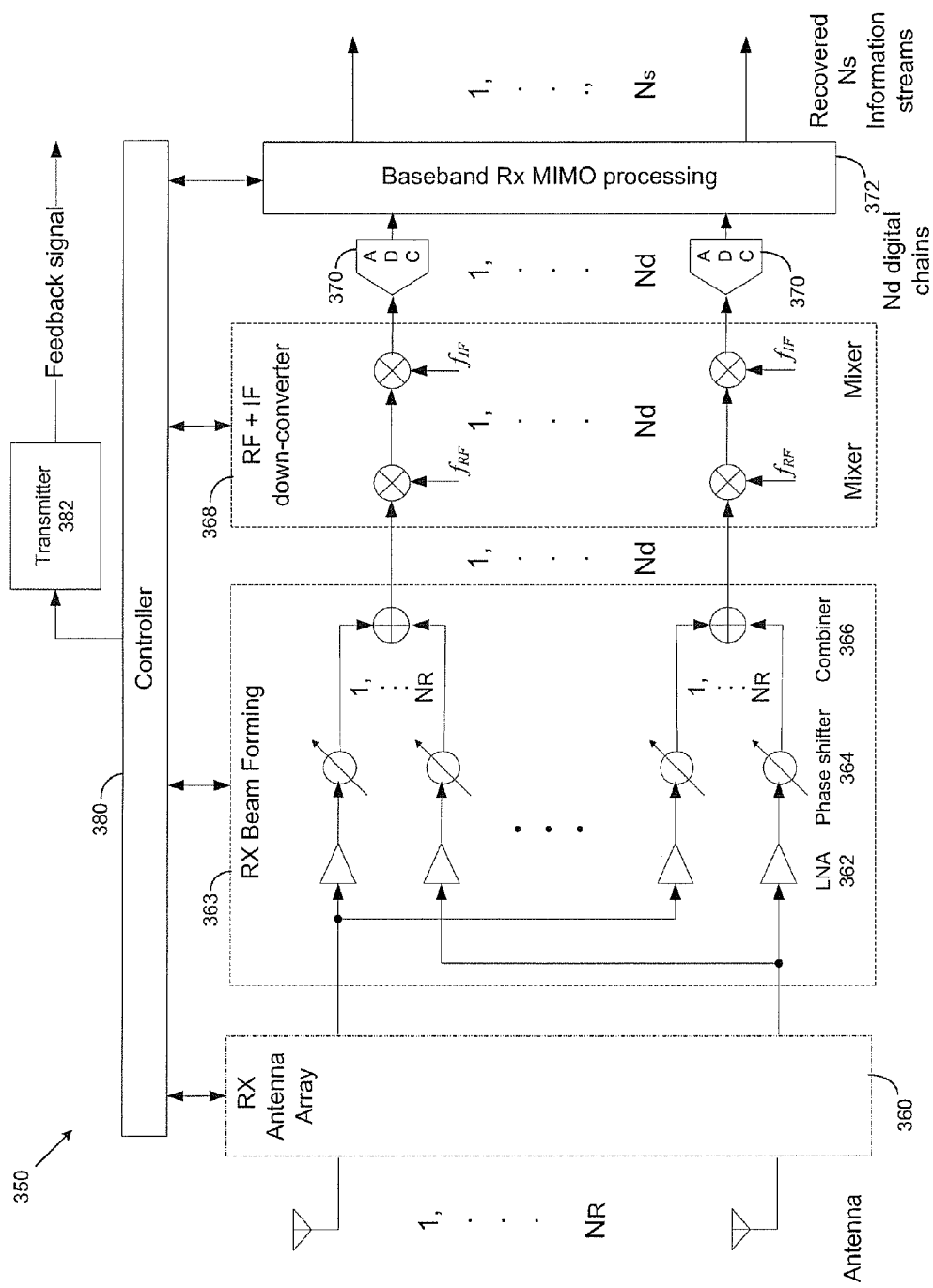
FIG. 3C illustrates a receive path for MIMO baseband processing and analog beam forming with a large number of antennas, according to embodiments of this disclosure.

FIG. 3C illustrates a receive path for MIMO baseband processing and analog beam forming with a large number of antennas, according to embodiments of this disclosure. The receive path 350 includes a beam forming architecture in which all of the signals received at the RX antennas are processed through an amplifier (e.g., a low noise amplifier (LNA)) and a phase shifter. The signals are then combined to form an analog stream that can be further converted to the baseband signal and processed in a baseband.

As shown in FIG. 3C, NR receive antennas 360 receive the signals transmitted by the transmit antennas over the air. Each receive antenna can have one or multiple antenna elements. The signals from the RX antennas are processed through the LNAs 362 and the phase shifters 364. The signals are then combined at a combiner 366 to form an analog stream. In total, Nd analog streams can be formed. Each analog stream can be further converted to the baseband signal via a RF and IF down-converter 368 and an analog to digital converter (ADC) 370. The converted digital signals can be processed in a baseband RX MIMO processing module 372 and other baseband processing, to obtain the recovered NS information streams. A controller 380 can interact with the RX modules including baseband processor, RF and IF down-converter 368, RX beam forming module 363, and RX antenna array module 360. The controller 380 can send signals to a transmitter module 382, which can send a feedback signal. The controller 380 can adjust the RX modules and determine and form the feedback signal.

Figure 3D:
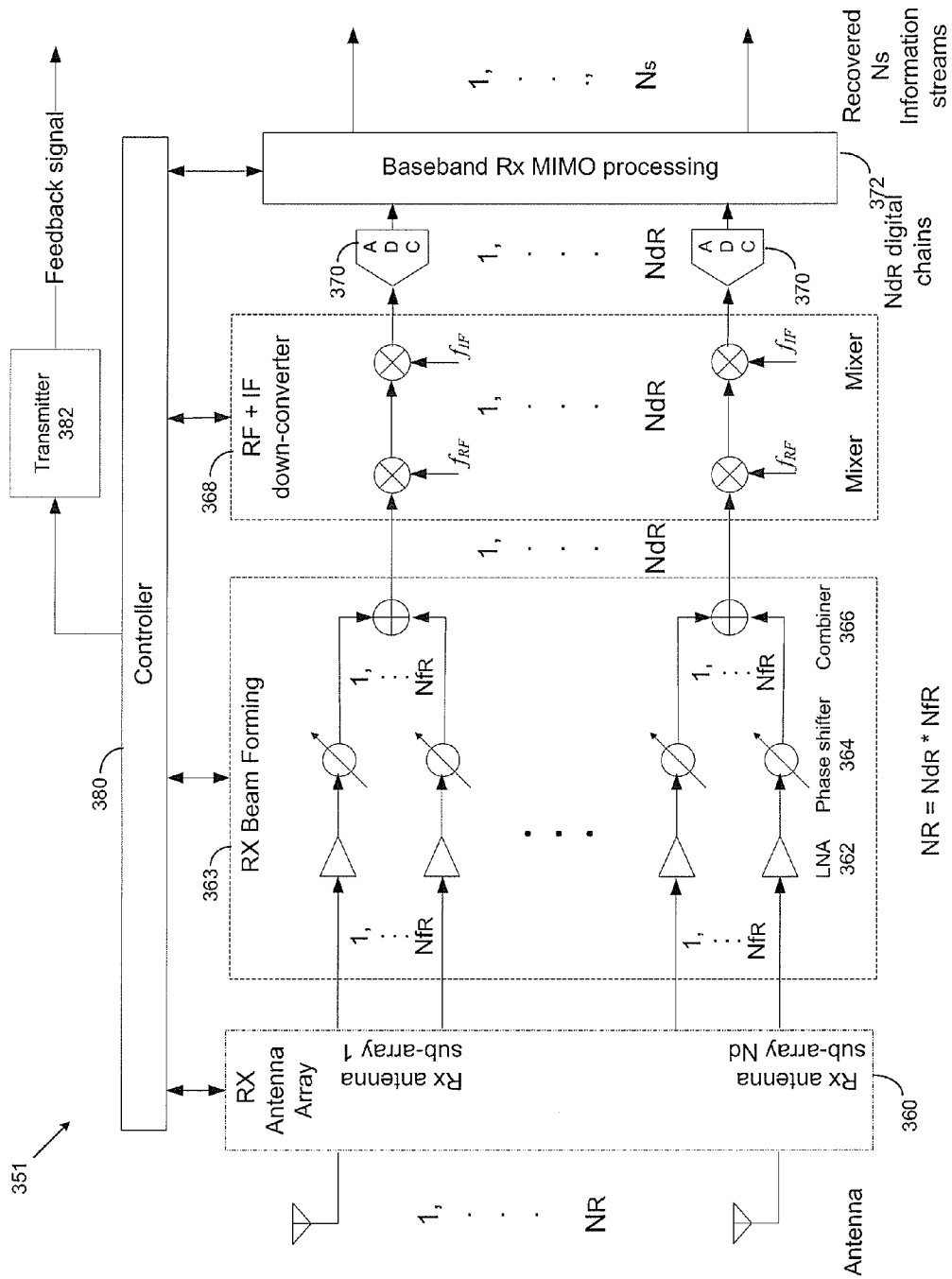
FIG. 3D illustrates another receive path for MIMO baseband processing and analog beam forming with a large number of antennas, according to embodiments of this disclosure.

FIG. 3D illustrates another receive path for MIMO baseband processing and analog beam forming with a large number of antennas, according to embodiments of this disclosure. The receive path 351 includes a beam forming architecture in which the signals received by a sub-array of the antenna array can be processed by amplifiers and phase shifters, to form an analog stream that can be converted and processed in the baseband. The receive path 351 is similar to the receive path 350 of FIG. 3C, except for differences in the beam forming module 363.

As shown in FIG. 3D, the signals received by NfR antennas of a sub-array of the antenna array 360 are processed by the LNAs 362 and phase shifters 364, and are combined at combiners 366 to form an analog stream. There can be NdR sub-arrays (NdR=NR/NFR), with each sub-array forming one analog stream. Hence, in total, NdR analog streams can be formed. Each analog stream can be converted to the baseband signal via a RF and IF down-converter 368 and an ADC 370. The NdR digital signals are processed in the baseband module 372 to recover the Ns information streams. The receive path 351 includes an equal number of antennas for each sub-array. However, the disclosure is not limited thereto. Rather, the number of antennas for each sub-array need not be equal across all sub-arrays.

The receive path 351 includes one output signal from the RF processing with one sub-array of antennas, as one of the inputs to the baseband processing. However, this disclosure is not limited thereto. Rather, one or multiple output signals from the RF processing with one sub-array of antennas, can be the inputs to the baseband processing. When multiple output signals from the RF processing with one sub-array of antennas are the inputs, each of the multiple output signals from the RF processing with one sub-array of antennas, can be connected to part of or all of the antennas of the said sub-array. For example, the RF and IF signal processing with each of the sub-array of antennas can be the same as the processing with the array of antennas as in FIG. 3C, or any type of the RF and IF signal processing with an array of antennas. The process related to one sub-array of the antennas can be referred to as one "RF chain".

In other embodiments, there can be other transmit and receive paths which are similar to the paths in FIGS. 3A through 3D, but with different beam forming structures. For example, the power amplifier 320 can be after the combiner 322, so the number of amplifiers can be reduced.

Figure 4:
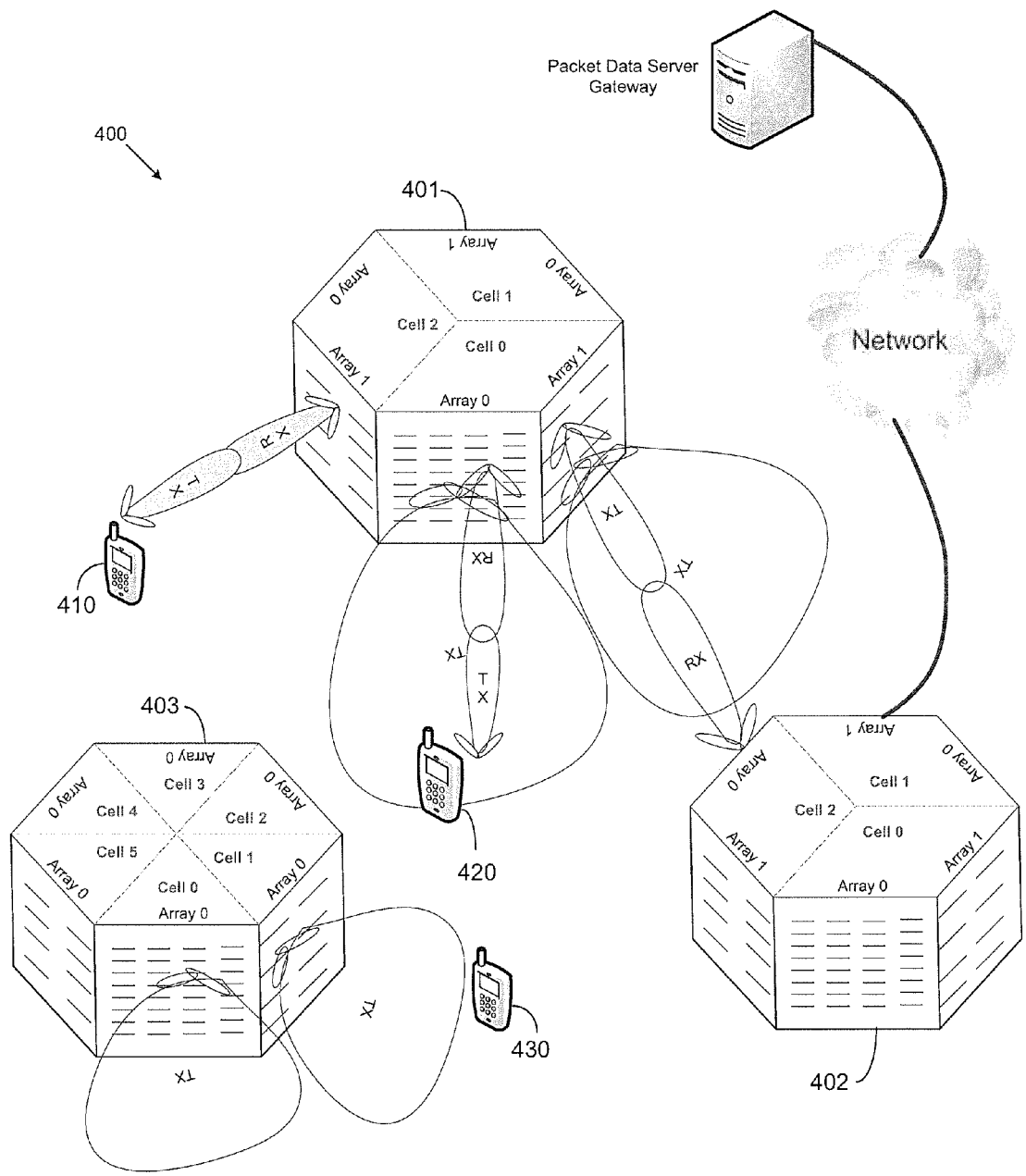
FIG. 4 illustrates a wireless communication system using antenna arrays, according to embodiments of this disclosure.

FIG. 4 illustrates a wireless communication system using antenna arrays, according to an embodiment of this disclosure. The embodiment of wireless communication system 400 illustrated in FIG. 4 is for illustration only. Other embodiments of the wireless communication system 400 could be used without departing from the scope of this disclosure.

As shown in FIG. 4, system 400 includes base stations 401-403 and mobile stations 410-430. Base stations 401-403 may represent one or more of base stations 101-103 of FIG. 1. Likewise, mobile stations 410-430 may represent one or more of subscriber stations 111-116 of FIG. 1.

BS 401 includes three cells, cell 0, cell 1, and cell 2. Each cell includes two arrays, array 0 and array 1. In cell 0 of BS 401, antenna array 0 and array 1 may transmit the same downlink control channels on a wide beam. However, array 0 can have a different frame structure from array 1. For example, array 0 can receive uplink unicast communication from MS 420, while array 1 can transmit downlink backhaul communication with cell 2 array 0 of BS 402. BS 402 includes a wired backhaul connecting to one or more backhaul networks. A synchronization channel (SCH) and broadcast channel (BCH) can also be transmitted over multiple beams with a beam width not as wide as the widest transmission beam from BS 401 shown in FIG. 4. Each of these multiple beams for the SCH or BCH may have a beam width wider than beams for unicast data communication, which can be for communication between a base station and a single mobile station.

Throughout the disclosure, the transmit beams can be formed by a transmit path such as shown in FIGS. 3A and 3B. Likewise, the receive beams can be formed by a receive path such as shown in FIGS. 3C and 3D.

One or more of the wireless links illustrated in FIG. 4 may be broken due to a LOS blockage (e.g., objects such as people or cars move into the LOS) or a NLOS may not have rays strong enough to maintain the communication. Even if a MS is close to a BS and the MS only moves a short distance, the link may be broken. In such an event, the MS may need to switch links if the current link cannot be recovered. A MS may need to switch links even if the MS is not at the cell edge.

If each antenna in the arrays is not positioned at a high elevation, then TX or RX beams substantially covering a sphere can be used. For example, if each beam is shaped like a pencil, then at each sampling point of a 360-degree circle of azimuth search, a 180-degree elevation search may be needed. Alternatively, if each antenna is positioned at a high elevation, then at each sampling point of a 360-degree circle of azimuth search, a less than 180-degree elevation search may be sufficient.

Figure 5:
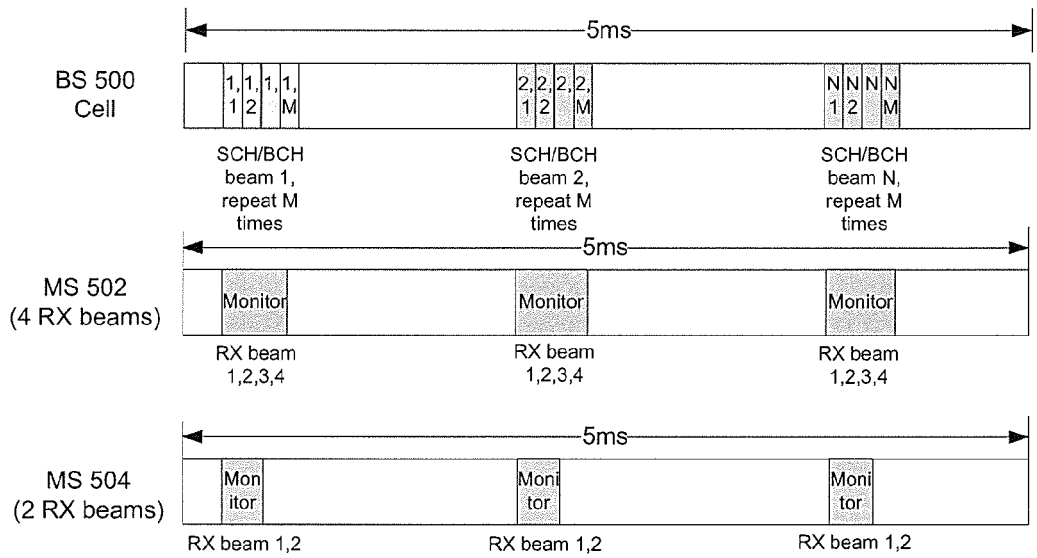
FIG. 5 illustrates an example of a mobile station scanning a base station, according to embodiments of this disclosure.

FIG. 5 illustrates an example of a mobile station scanning a base station, according to an embodiment of this disclosure. The embodiment illustrated in FIG. 5 is for illustration only. Other embodiments could be used without departing from the scope of this disclosure. The mobile station and base station described in FIG. 5 may represent one or more of the mobile stations and base stations depicted in FIG. 4.

As shown in FIG. 5, base station 500 transmits the synchronization channel (SCH), the reference signals (e.g., the cell specific reference signal (CRS)), the broadcast channel (BCH), and the like, over N TX beams in a cell (or sector), in N time instances, with a period of time between adjacent instances. The periods of time between instances can be equal, approximately equal, or not equal. In each time instance, the SCH/BCH is sent over one of the beams in a sector. In each time instance on one beam, the information can be repeated M times to allow the mobile station to steer its RX beams to receive the SCH/BCH. The M repetitions can be transmitted contiguously one after another, or there can be a period of time that elapses between the adjacent repetitions.

Throughout this disclosure, the "SCH/BCH" is used as an example of the signals transmitted by the BS, but the embodiments are not limited to cases where the signals are SCH and BCH. The "SCH/BCH" should be interpreted as various cases, where some examples are given as follows. In certain embodiments, the signals from the BS that the MS detects so that the MS can select a BS to access for initial network entry or network re-entry (e.g., when the MS wakes up from the idle mode) can include SCH, the reference signal (e.g., CRS), and BCH, where the BCH may carry some important information that the MS needs to know, e.g., bandwidth, etc. In certain embodiments, the signals from the neighboring BS or BSs that the MS monitors (e.g., for possible handover when the MS is in connected mode, or when the MS is connected with a serving BS) can include SCH, and the reference signal (RS) (e.g., CRS), where the RS can be used for the MS to measure the signal strength of the neighboring BS. In certain embodiments, the signals from the neighboring BS that the MS monitors can include SCH, the reference signal (e.g., CRS), and BCH, where the BCH may carry some important information that the MS needs to know, e.g., cell bar indication which indicates whether the cell is currently barred for the MS to access.

If the mobile station has P RX beams to receive the SCH/BCH, the number of repetitions M at one of BS 500's TX beams may be at least P. The mobile station with P RX beams can use the time of P repetitions out of the total of M repetitions on one TX beam for scanning of the SCH/BCH. That is, the MS steers all of its P RX beams to scan the SCH/BCH of the cell, with one scanning for each beam. Hereinafter, this embodiment for scanning described with respect to FIG. 5 may also be referred to as "Embodiment 1".

In the example depicted in FIG. 5, N=3 and M=4. The frame length is 5 ms. MS 502 with 4 RX beams uses the time of 4 repetitions on one SCH/BCH beam to monitor the beam, and performs the scanning for the 3 TX beams. MS 504 with 2 RX beam uses the time of 2 repetitions on one SCH/BCH beam to monitor the beam, and performs the scanning for the 3 TX beams.

Figure 6:
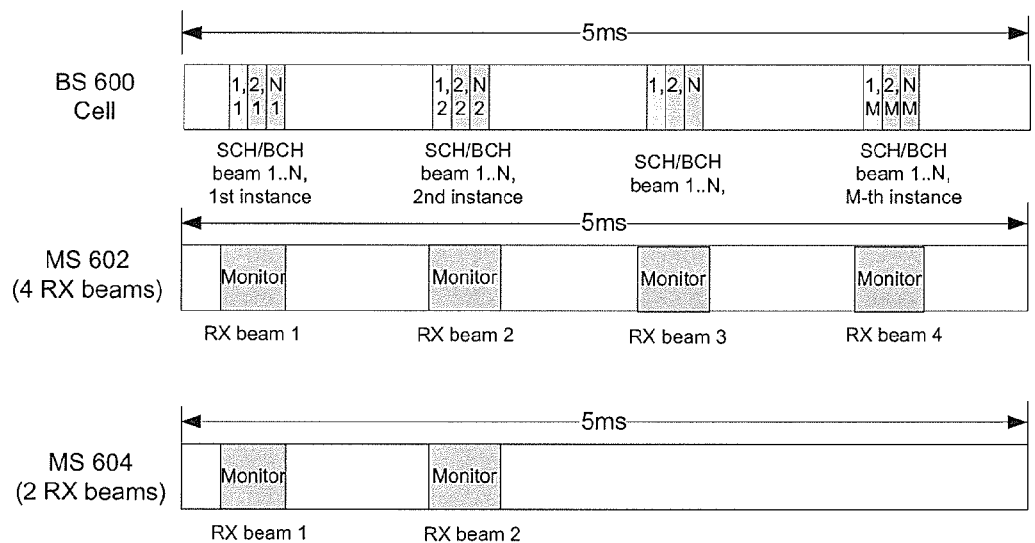
FIG. 6 illustrates an example of a mobile station scanning a base station, according to embodiments of this disclosure.

FIG. 6 illustrates an example of a mobile station scanning a base station, according to embodiments of this disclosure. The embodiment illustrated in FIG. 6 is for illustration only. Other embodiments could be used without departing from the scope of this disclosure. The mobile station and base station described in FIG. 6 may represent one or more of the mobile stations and base stations depicted in FIG. 4.

As shown in FIG. 6, base station 600 transmits the SCH/BCH over N TX beams in a cell (or sector), in M time instances, with a period of time between adjacent instances. The periods of time between instances can be equal, approximately equal, or not equal. The SCH/BCH can be repeated in M time instances, to allow the mobile station to steer its RX beams to receive the SCH/BCH.

If the mobile station has P RX beams to receive the SCH/BCH, the number of repetition M at one of BS 600's TX beams can be at least P. The mobile station with P RX beams can use the time of P repetitions out of the total of M repetitions on one TX beam for the SCH/BCH, to scan the SCH/BCH of the cell, with one scanning for each beam. During the time of each instance or repetition of all the TX beams, the MS can hold one of its RX beams. Hereinafter, this embodiment for scanning described with respect to FIG. 6 may also be referred to as "Embodiment 2".

In the example depicted in FIG. 6, N=3 and M=4. MS 602 with 4 RX beams uses the time of 4 repetitions on one SCH/BCH beam to monitor the beam, and performs the scanning for the 3 TX beams. MS 604 with 2 RX beam uses the time of 2 repetitions on one SCH/BCH beam to monitor the beam, and performs the scanning for the 3 TX beams. The two monitoring intervals using two different RX beams do not need to be for consecutive instances of the TX beams.

Figure 7:
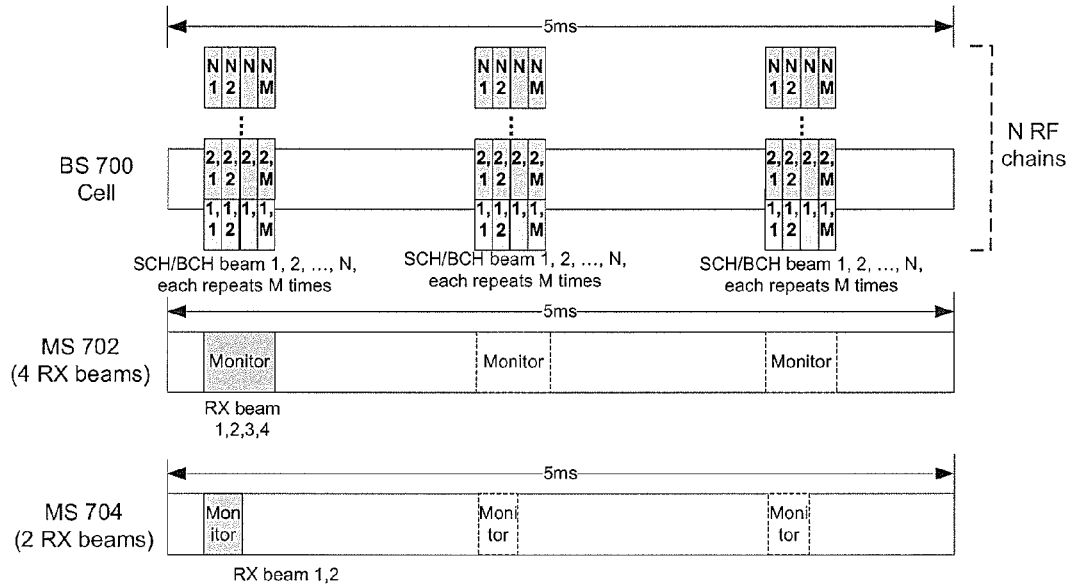
FIG. 7 illustrates an example of a mobile station scanning a base station, according to embodiments of this disclosure.

FIG. 7 illustrates an example of a mobile station scanning a base station, according to embodiments of this disclosure. The embodiment illustrated in FIG. 7 is for illustration only. Other embodiments could be used without departing from the scope of this disclosure. The mobile station and base station described in FIG. 7 may represent one or more of the mobile stations and base stations depicted in FIG. 4.

As shown in FIG. 7, the base station 700 transmits the SCH/BCH over N beams in a sector, in Q time instances, with a period of time between adjacent instances. The periods of time between instances can be equal, approximately equal, or not equal. In each time instance, the SCH/BCH are sent over all the beams in a sector. In each time instance on all beams, the information can be repeated M times, to allow the mobile station to steer its RX beams to receive the SCH/BCH.

If the mobile station has P RX beams to receive the SCH/BCH, the number of repetitions M at one of BS 700's TX beams can be at least P. The mobile station with P RX beams can use the time of P repetitions out of the total of M repetitions on one TX beam for the SCH/BCH, to scan the SCH/BCH of the cell, with one scanning for each beam.

Hereinafter, this embodiment for scanning described with respect to FIG. 7 may also be referred to as "Embodiment 3". If at each time instance, there is one repetition (M=1), and if there are Q time instances, Embodiment 3 becomes Embodiment 2 with Q>=P. In such a case, instead of steering the TX beam, the information is transmitted over all the beams.

If there is only one time instance (Q=1), Embodiment 3 becomes Embodiment 1. In such a case, instead of steering the TX beam, the information is transmitted over all the beams.

In the example depicted in FIG. 7, N=3, M=4, and Q=3. MS 702 with 4 RX beam uses the time of 4 repetitions on SCH/BCH beams to monitor the beams, and with one scanning for 3 beams at one time. MS 704 with 2 RX beam uses the time of 2 repetitions on SCH/BCH beams to monitor the beams, and with one scanning for 3 beams.

Figure 8:
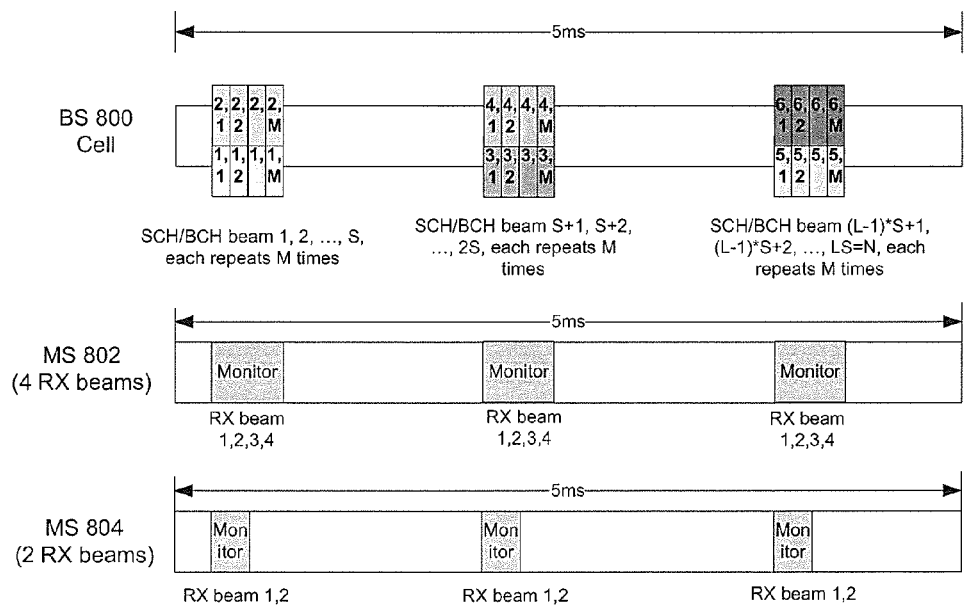
FIG. 8 illustrates an example of a mobile station scanning a base station, according to embodiments of this disclosure.

FIG. 8 illustrates an example of a mobile station scanning a base station, according to embodiments of this disclosure. The embodiment illustrated in FIG. 8 is for illustration only. Other embodiments could be used without departing from the scope of this disclosure. The mobile station and base station described in FIG. 8 may represent one or more of the mobile stations and base stations depicted in FIG. 4.

In FIG. 8, base station 800 is able to transmit on only S beams (out of N) in a sector simultaneously. In one embodiment, base station 800 transmits S beams in L time instances, with a period of time between adjacent instances. The periods of time between instances can be equal, approximately equal, or not equal. In each time instance, base station 800 transmits the SCH/BCH a subset of size S of the N beams in a sector. In each time instance, the information can be repeated M times, to allow the mobile station to steer its RX beam to receive the SCH/BCH. A different subset of the N TX beams of size S is selected in different time instances to ensure that all the N TX beams are exercised in the L time instances. Thus, in some embodiments, L is at least ⌈N/S⌉. When S=1, this embodiment (hereinafter referred to as "Embodiment 4") is similar to Embodiment 1 described above. If the mobile station has P RX beams, then M should be at least P.

In the example depicted in FIG. 8, N=6, L=3, M=4, and S=2. MS 802 with 4 RX beams uses 4 repetitions on SCH/BCH to monitor 2 TX beams in one instance. MS 804 with 2 RX beams uses 2 repetitions on SCH/BCH to monitor 2 TX beams in one instance.

Figure 9:
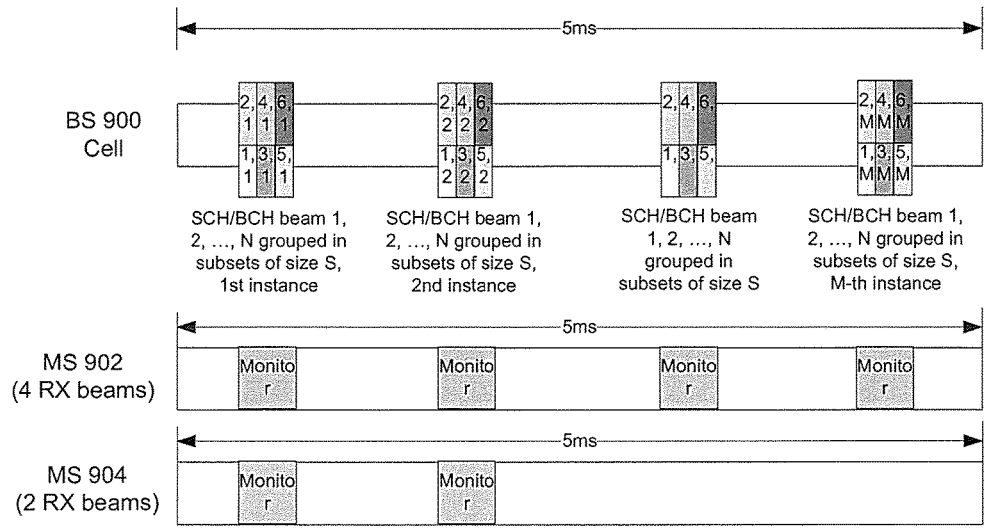
FIG. 9 illustrates an example of a mobile station scanning a base station, according to embodiments of this disclosure.

FIG. 9 illustrates an example of a mobile station scanning a base station, according to embodiments of this disclosure. The embodiment illustrated in FIG. 9 is for illustration only. Other embodiments could be used without departing from the scope of this disclosure. The mobile station and base station described in FIG. 9 may represent one or more of the mobile stations and base stations depicted in FIG. 4.

In FIG. 9, base station 900 transmits the SCH/BCH over S beams (out of N) in a sector simultaneously in M time instances, with a period of time between adjacent instances. The periods of time between instances can be equal, approximately equal, or not equal. In each time instance, base station 900 transmits the SCH/BCH L times with each transmission comprising a subset of size S of the N beams in a sector such that all the N TX beams are exercised in the L transmissions in a time instance. Thus, in some embodiments, L is at least [N/S]. When S=N, this embodiment (hereinafter referred to as "Embodiment 5") is similar to Embodiment 2 described above. If the mobile station has P RX beams, then M should be at least P.

In the example depicted in FIG. 9, N=6, L=3, M=4, and S=2. MS 902 with 4 RX beams uses 4 instances to monitor all TX beams. MS 904 with 2 RX beams uses 2 instances to monitor all TX beams.

In synchronous systems, multiple base stations can be synchronized to align their transmissions of the SCH/BCH. In synchronous systems, the MS can perform cell scanning, e.g., scanning its serving cell and neighboring cells, on the SCH/BCH at the time when the SCH/BCH are transmitted.

In asynchronous systems, the base stations may not be synchronized, such that the transmissions of the SCH/BCH are not aligned in the time domain. Accordingly, in asynchronous systems, the MS steers its RX beams away from data communication to scan its serving cell and neighboring cells on SCH/BCH, if MS RX beam forming is used. The scanning time may also be increased. In some situations, an entire frame may be needed.

Figure 10:
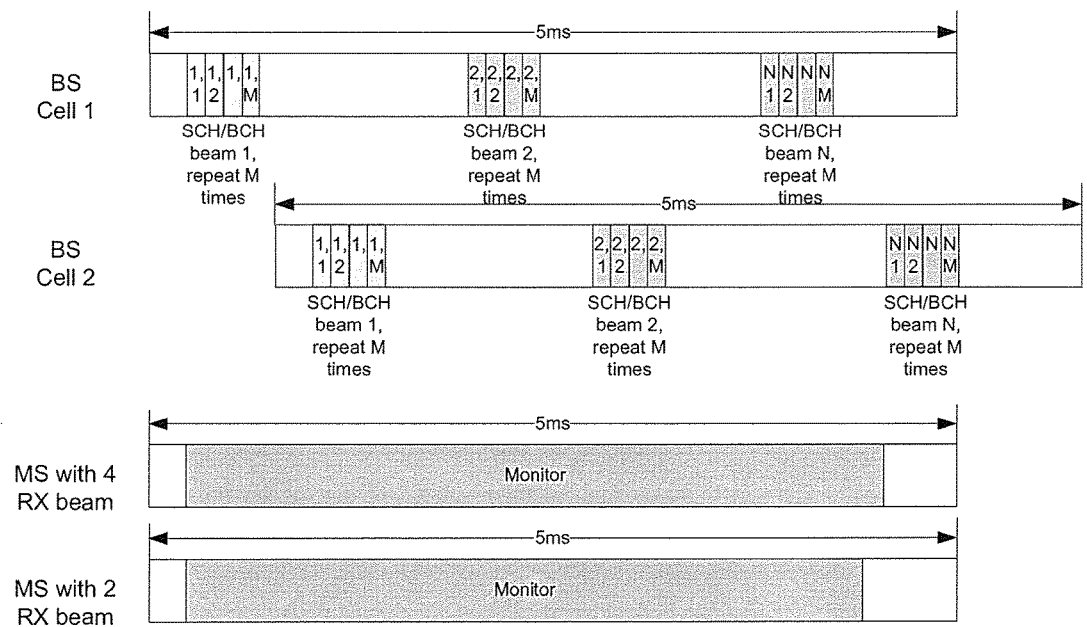
FIGS. 10 through 12 illustrate examples of a mobile station scanning base stations in an asynchronous system, according to embodiments of this disclosure.
Figure 11:
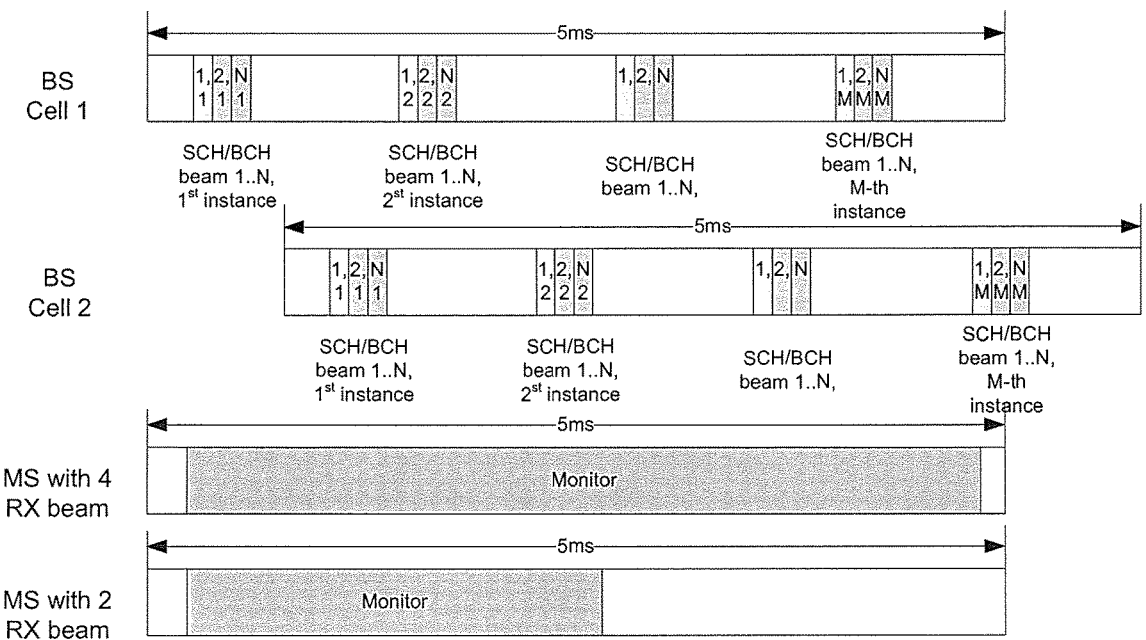
Figure 12:
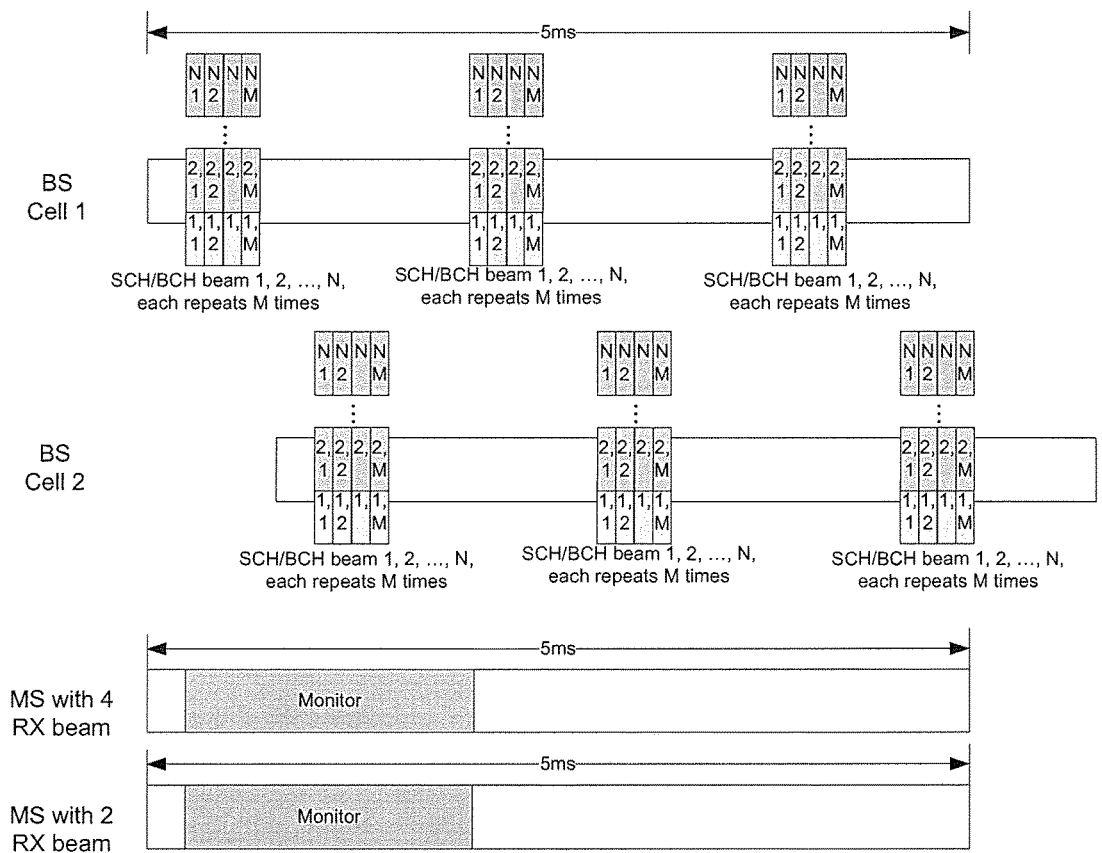

For example, FIGS. 10 through 12 illustrate examples of a mobile station scanning base stations in an asynchronous system, according to embodiments of this disclosure. The embodiments illustrated in FIGS. 10 through 12 are for illustration only. Other embodiments could be used without departing from the scope of this disclosure.

FIG. 10 depicts mobile stations scanning base stations in an asynchronous system using Embodiment 1 described above. As shown in FIG. 10, the worst case scenario is that monitoring may take an entire frame or almost an entire frame.

FIG. 11 depicts mobile stations scanning base stations in an asynchronous system using Embodiment 2 described above. As shown in FIG. 11, the worst case for a mobile station with N RX beams is that monitoring may take an entire frame. However, for a mobile station with fewer RX beams, the monitoring can take less time. In such a case, the network can configure the monitoring time for mobile stations with different numbers of RX beams. The mobile station can hold one of its RX beam for the time of X/P, where X is the subframe length, and P is the number of RX beams.

FIG. 12 depicts mobile stations scanning base stations in an asynchronous system using Embodiment 3 described above. As shown in FIG. 12, the mobile station may use less time for monitoring or scanning the cells. The monitoring interval length is at least (frame length)/N, such that the monitoring interval length can cover at least one SCH/BCH instance of each cell.

Figure 13:
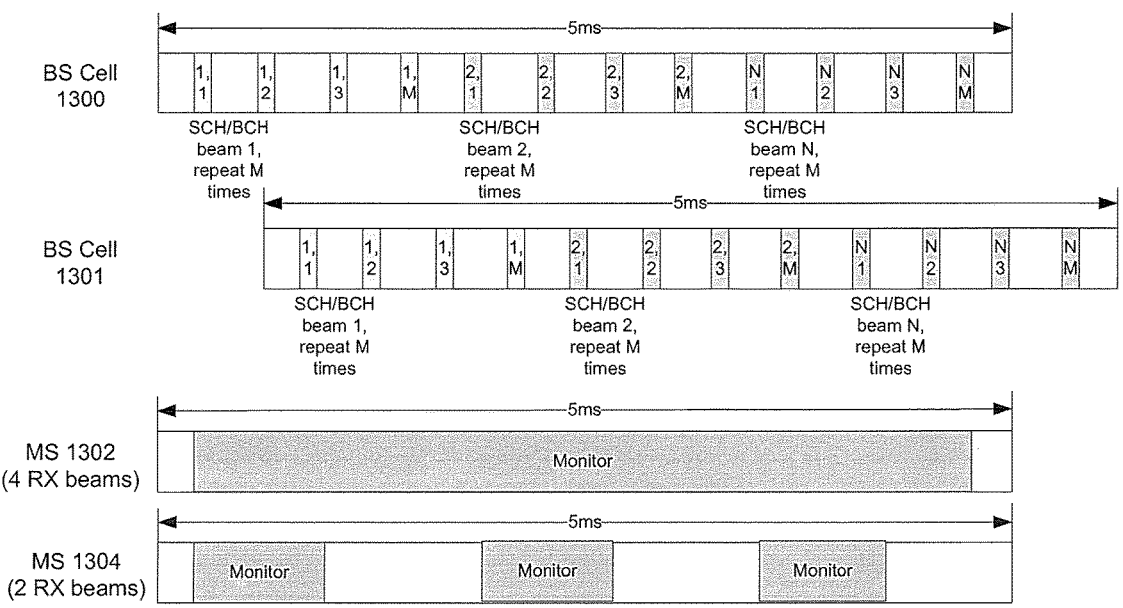
FIG. 13 illustrates an example of a mobile station scanning a plurality of base stations, according to embodiments of this disclosure.

FIG. 13 illustrates an example of a mobile station scanning a plurality of base stations, according to embodiments of this disclosure. The embodiment illustrated in FIG. 13 is for illustration only. Other embodiments could be used without departing from the scope of this disclosure. The mobile station and base station described in FIG. 13 may represent one or more of the mobile stations and base stations depicted in FIG. 4.

As shown in FIG. 13, base station 1300 and base station 1031 each transmit the control channel SCH/BCH over M repetitions. The M repetitions of the SCH/BCH on the same beam may be placed in the time domain with time intervals between adjacent repetitions. For example, the repetitions of the beams can be distributed with the same distances or similar distances across the entire subframe.

For cell scanning in an asynchronous system, a mobile station with fewer RX beams can reduce the time used to scan the cells. For example, as depicted in FIG. 13, M=4. When there are 4 repetitions on each beam at the TX side, MS 1304 with 2 RX beams can use half of the time to do the scanning as compared to MS 1302, which has 4 RX beams. MS 1304 is still able to scan all the possibilities of all the TX and RX beam pairs. In the example depicted in FIG. 13, MS 1304 can keep one of its RX beam for half of the monitoring time, and switch to its second RX beam for the second half of the monitoring time. If MS 1304 has two RF chains to form these 2 RX beams, such that these 2 RX beams can be formed concurrently, then MS 1304 can further reduce the monitoring by half. Hereinafter, this embodiment for scanning described with respect to FIG. 13 may also be referred to as "Embodiment 6".

Figure 14:
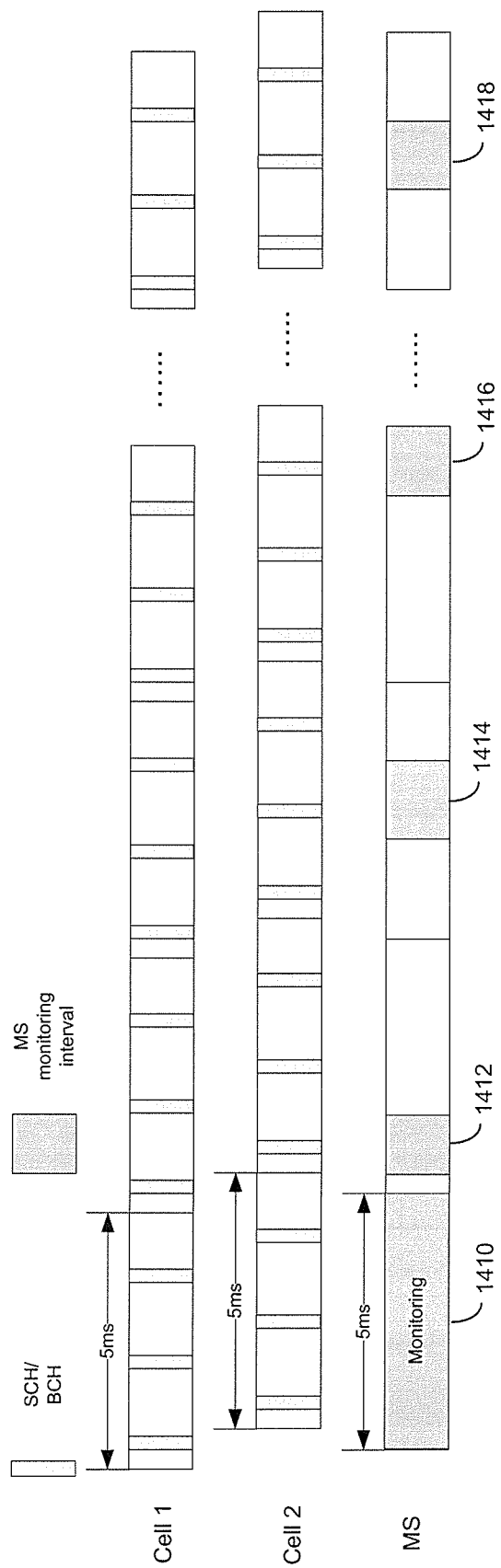
FIG. 14 illustrates an example of a mobile station scanning a plurality of base stations using flexible monitoring intervals, according to embodiments of this disclosure.

FIG. 14 illustrates an example of a mobile station scanning a plurality of base stations using flexible monitoring intervals, according to embodiments of this disclosure. The embodiment illustrated in FIG. 14 is for illustration only. Other embodiments could be used without departing from the scope of this disclosure. The mobile station and base station described in FIG. 14 may represent one or more of the mobile stations and base stations depicted in FIG. 4.

In FIG. 14, the time that the mobile station uses to scan Cell 1 and Cell 2 on the SCH/BCH can be scalable. One or more larger intervals can be used initially, while smaller intervals can be used in follow up frames. For example, as shown in FIG. 14, during a 100 ms period, a 5 ms interval 1410 may be followed by smaller intervals 1412-1418, each having a duration of 1 ms. The base station can configure the intervals, or the mobile station can perform autonomous scanning. In some embodiments, the duration between two slots can be randomized. In some embodiments, the larger interval can take the whole frame, and the smaller intervals can take a different portion with respect to the frame. For example, the larger interval 1410 can take a first whole frame, the small interval 1412 can take the first one-third portion of a second frame (the beginning portion of the frame), the small interval 1414 can take the second one-third portion of a third frame (the middle portion of the frame), and the small interval 1416 can take the last one-third portion of a fourth frame (the end portion of the frame).

Figure 15:
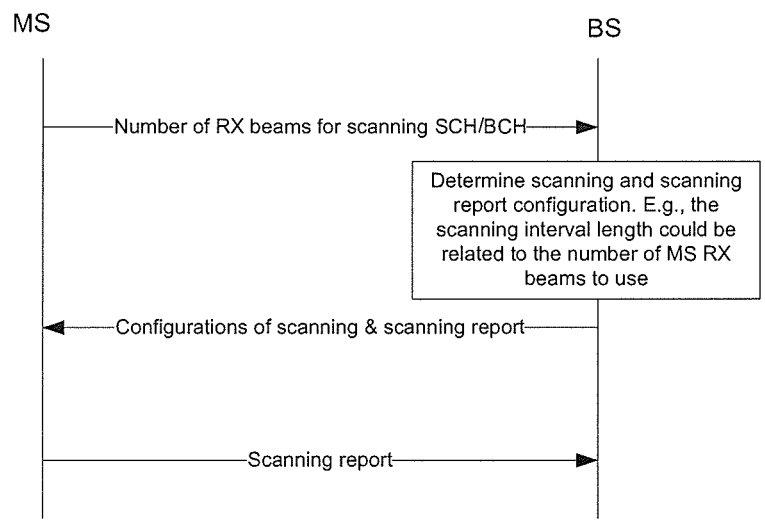
FIG. 15 depicts a signal flow diagram illustrating a mobile station informing a base station of receive beams to scan cells, according to embodiments of this disclosure.

FIG. 15 depicts a signal flow diagram illustrating a mobile station informing a base station of receive beams to scan cells, according to embodiments of this disclosure. In the embodiment, the mobile station informs the base station which RX beams will be used to scan cells. The base station then configures the time intervals for the mobile station to scan cells where the time interval patterns or the length can be a mapping of the number of mobile station RX beams. The embodiment illustrated in FIG. 15 is for illustration only. Other embodiments could be used without departing from the scope of this disclosure.

As shown in FIG. 15, the MS transmits the number of RX beams to be used for SCH/BCH scanning to the base station or the network. Then, the base station or the network determines how to configure the scanning. For example, the base station or network may configure scanning intervals, periodicity, trigger conditions, reporting format, and the like, for the mobile station. For example, if the mobile station has a relatively smaller number of RX beams, the base station or the network may not need to assign a longer interval for the mobile station to perform scanning its serving cell and neighboring cells on the SCH/BCH beams.

In another embodiment, the base station or the network can configure the mobile station's RX beams for SCH/BCH scanning (e.g., how many RX beams that the MS should use for SCH/BCH scanning), as well as configure the scanning (e.g., configure scanning intervals, periodicity, trigger conditions, reporting format, and the like) for the mobile station. The scanning configuration can be related to the mobile station's RX beams to use. For example, if the MS has fewer number of RX beams, the base station or the network may not need to assign longer interval for the MS to perform scanning its serving cell and neighboring cells on the SCH/BCH beams.

In another embodiment, instead of the mobile station informing the base station how many RX beams the mobile station has to scan, the mobile station provides the base station the same or similar information in terms of the time required for scanning, e.g., how much (nominal or minimal) time would be used to finish scanning across all RX beams.

In an embodiment, the base station or the network can inform the mobile station of the configurations of the pattern of the SCH/BCH transmissions. For example, the base station informs the mobile station that the SCH/BCH transmissions are following one or more predetermined patterns. As a particular example, the one or more predetermined patterns can represent a pattern described in Embodiment 1, 2, 3, 4, 5, or 6. Then, the mobile station can use the pattern configuration to determine the proper interval length for the mobile station to scan cells in an autonomous manner, without the base station or the network configuring the time intervals or the timings to scan cells.

For example, the information on the pattern of the transmission of SCH/BCH can be pre-installed or pre-configured in the mobile station. As another example, the mobile station attempts different configurations in the initial access; then after initial access, the mobile station can receive or determine the information on the pattern of the transmission of SCH/BCH.

Figure 16:
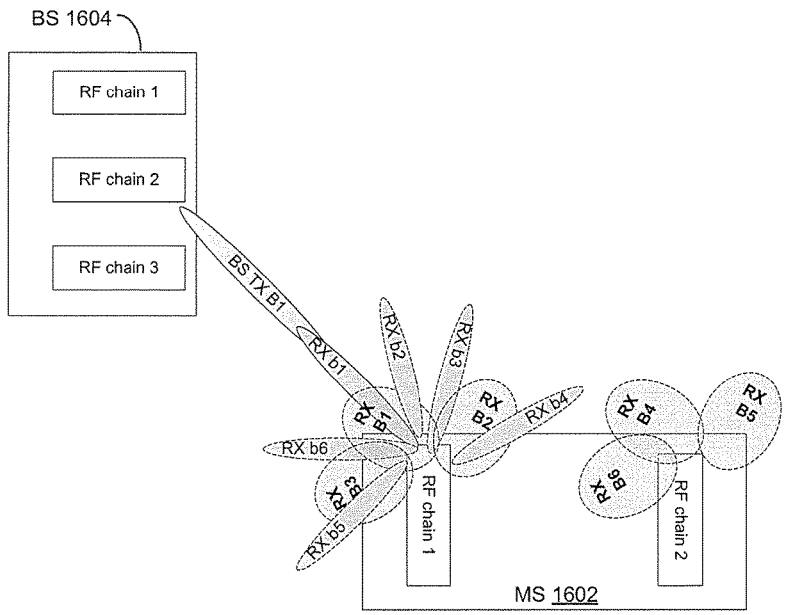
FIG. 16 illustrates an example of a mobile station scanning a base station using two levels of beam forming, according to embodiments of this disclosure.
Figure 16:
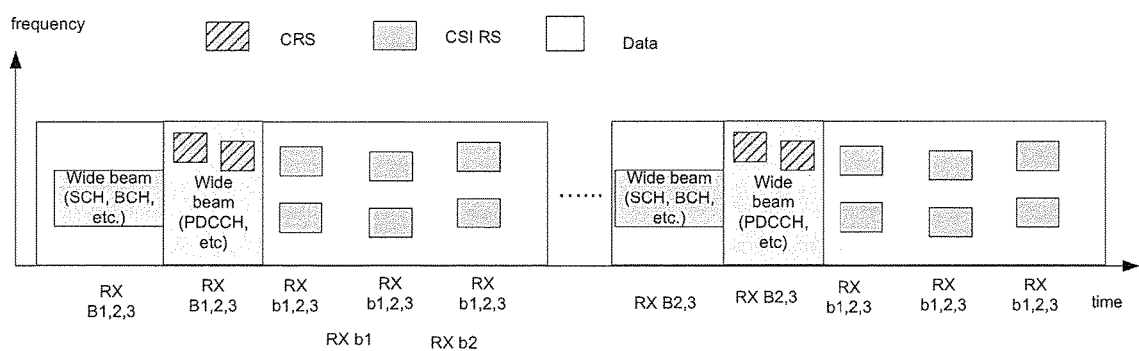

FIG. 16 illustrates an example of a mobile station scanning a base station using two levels of beam forming, according to embodiments of this disclosure. The embodiment illustrated in FIG. 16 is for illustration only. Other embodiments could be used without departing from the scope of this disclosure. The mobile station and base station described in FIG. 16 may represent one or more of the mobile stations and base stations depicted in FIG. 4.

As shown in FIG. 16, MS 1602 operates using two levels of beam forming. A first level of beam forming (e.g., RF beam forming) gives the mobile station relatively wider RX beams. The wide RX beams can be used to monitor the control channels such as the SCH and BCH. A second level of beam forming (e.g., digital beam forming) gives the mobile station relatively narrower RX beams. The narrow RX beams can be used for data communication. MS 1602 can use narrow RX beams to communicate with BS 1604 on the data communication, while in the same subframe still can use the RF beam to monitor the wide beam. As a particular example, MS 1602 uses narrow beam RX b1 for data communication, and uses wide beam RX B1 to receive or scan the SCH/BCH which could be received by B1. MS 1602 can overhear some wide beams; then in the wide beam monitoring, MS 1602 can limit the angles or beams for wide beam monitoring. MS 1602 can also have one of multiple RF chains to form the RX beams.

In an embodiment, the mobile station scans wide beams such as the SCH and BCH. The mobile station can limit the angles or beams for wide beam scanning. The mobile station may not need to scan those regions where the data communication beams cover. Dedicated slots for data communication can be used. In the slots for data, the mobile station can perform the scanning cell's SCH/BCH with the RF beam for the data communication.

Dedicated slots for mobile station scanning cells can also be used. The mobile station can scan limited spatial regions (e.g., limited beam directions, a subset of all the beam directions, and the like). For example, the mobile station can scan the region not covered by the data communication's RF beams. This may reduce the scanning overhead.

The mobile station determines the limited spatial region to scan. Another alternative is that the network can configure the mobile station to do scanning with limited regions, based on the knowledge about the current data communication.

Figure 17:
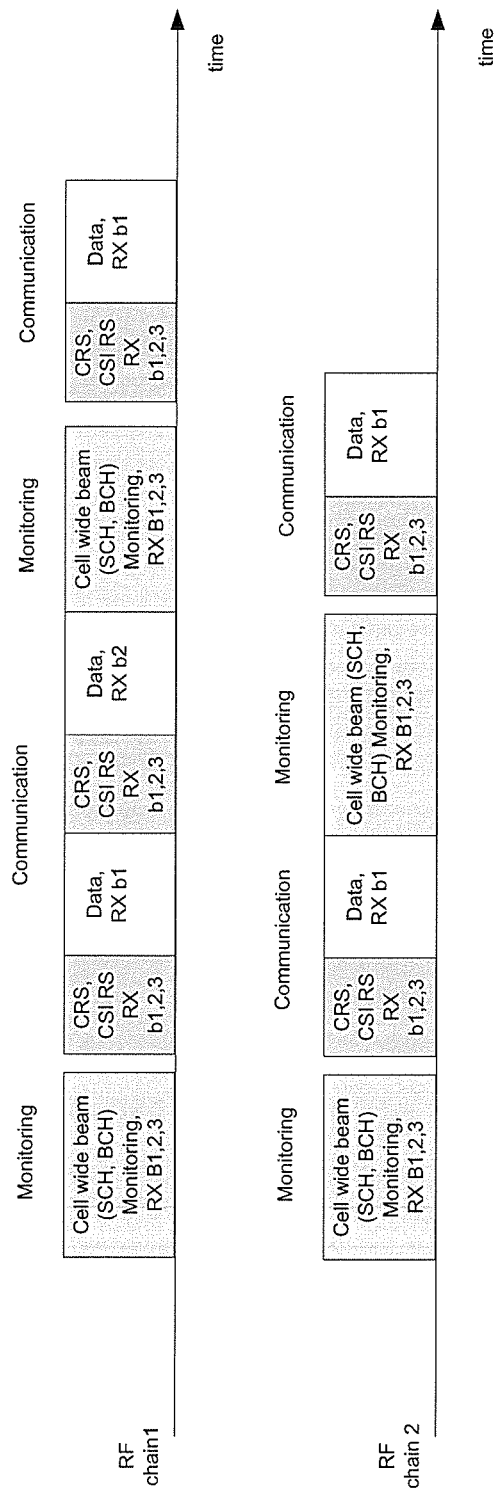
FIG. 17 illustrates an example of different RF chains handling data communication and cell scanning in parallel, according to embodiments of this disclosure.

FIG. 17 illustrates an example of different RF chains handling data communication and cell scanning in parallel, according to embodiments of this disclosure. The embodiment illustrated in FIG. 17 is for illustration only. Other embodiments could be used without departing from the scope of this disclosure.

Some slots may be used for concurrent data communication and mobile station scanning. For such instances, if the mobile station has multiple RF chains, the RF chains can be split at the mobile station's receive time such that some RF chains are used for data communication while other RF chains are used for the mobile station scanning cells' SCH/BCH, and the like.

Figure 18:
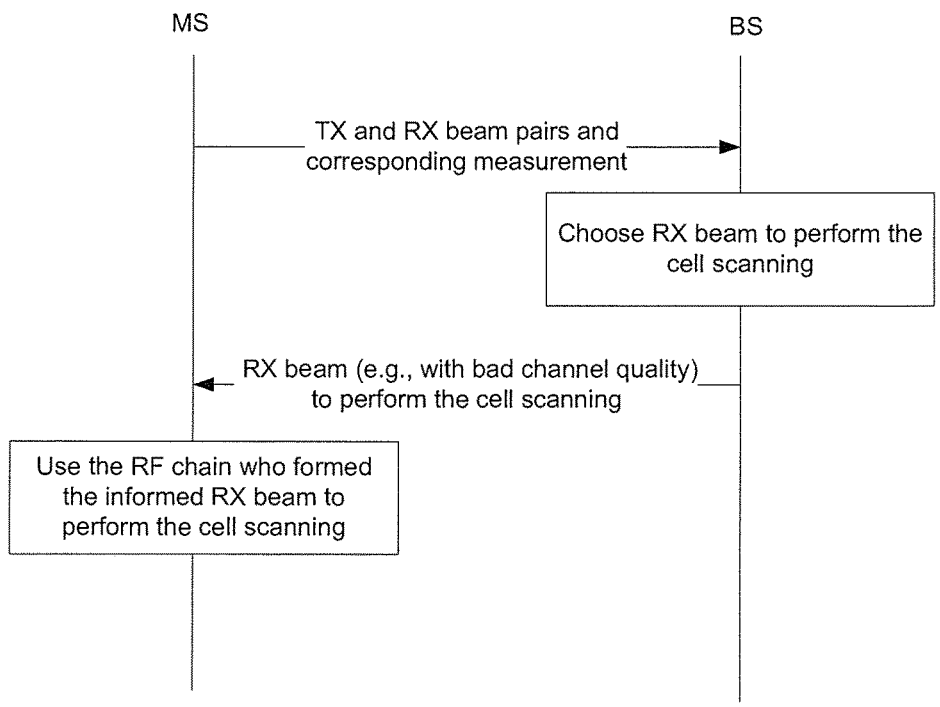
FIGS. 18 through 20 illustrate examples of a mobile station and base station determining which RF chain to perform cell scanning, according to embodiments of this disclosure.
Figure 19:
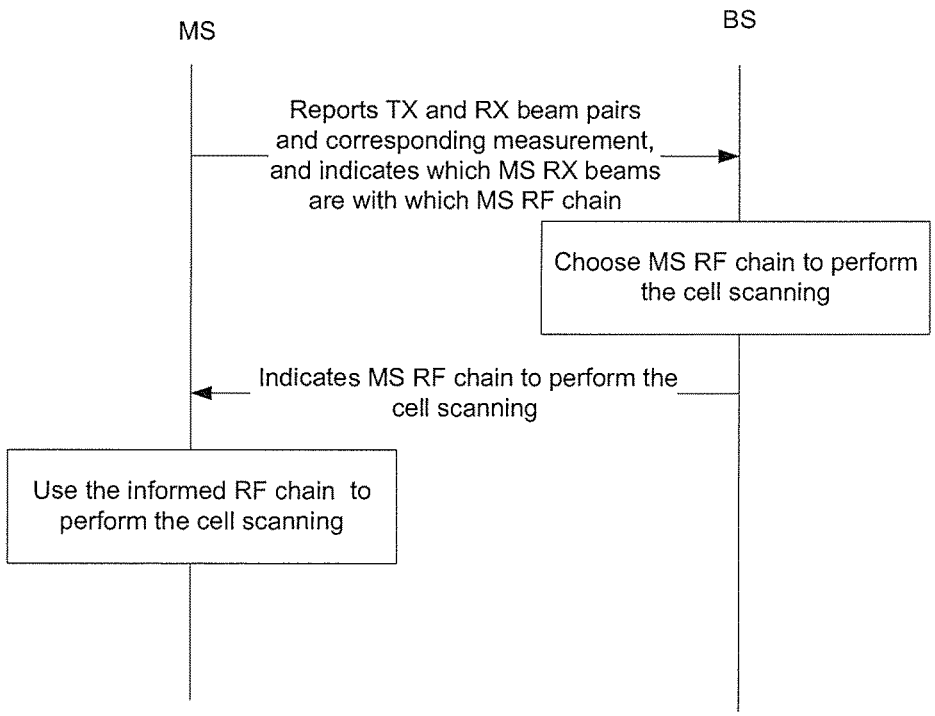
Figure 20:
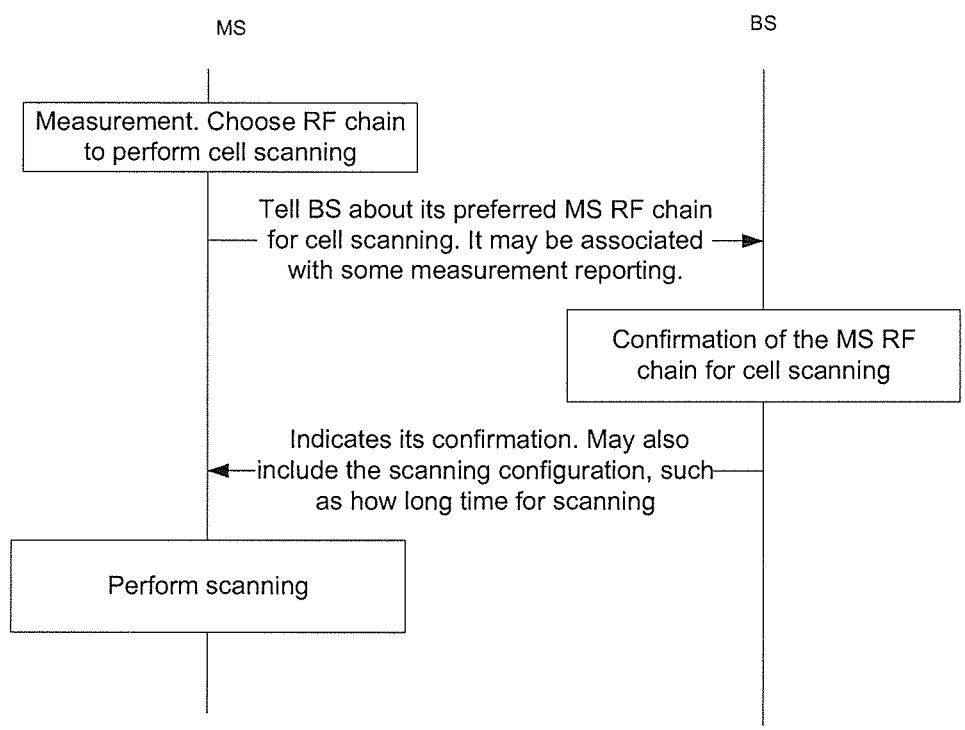

FIGS. 18 through 20 illustrate examples of a mobile station and base station determining which RF chain to perform cell scanning, according to embodiments of this disclosure. The embodiments illustrated in FIGS. 18 through 20 are for illustration only. Other embodiments could be used without departing from the scope of this disclosure.

Based on certain measurements (e.g., the measurement on the reference signals, the SCH/BCH, and the like), the channel quality can be determined. The channel quality can be, for example, the signal to noise and interference ratio, the signal to interference ratio, the reference signal received power, reference signal received quality, and the like.

As shown in FIG. 18, the mobile station can report the channel qualities to the base station. The report can include the base station TX and mobile station RX beam pairs and corresponding measurement metric. When the base station receives the report, the base station determines which RX beams exhibit good or bad channel quality. Then the base station can signal the mobile station regarding the base station's selections for the RX beams (e.g., the RX beams with relatively bad channel quality) to perform the cell scanning, or the mobile station RX beams for data communication (e.g., the RX beams with relatively good channel quality). Once the mobile station receives the signal, the mobile station can use the RF chain that formed the informed RX beam to perform the cell scanning.

As shown in FIG. 19, the mobile station can report the TX and RX beam pairs and corresponding measurement metric, and also indicate which mobile station RX beams are with which mobile station RF chain. When the base station receives the report, the base station determines which RX beams and mobile station RF chain exhibit good or bad channel quality. Then the base station can request the mobile station to use the RF chain that forms the RX beams with bad channel quality to perform the cell scanning.

As shown in FIG. 20, the mobile station determines which RF chain(s) to perform cell scanning, and which RF chain(s) for data communication. The mobile station then informs the base station about the determined RF chains. Then the base station determines how the data communication and cell scanning can be split among the RF chains. The base station can also send one or more signals including the scanning configuration, such as the duration for scanning. Then the mobile station performs cell scanning on the confirmed RF chain, and possibly based on the scanning configuration. The chain with a relatively good channel quality can maintain the data communication, and the chain with a relatively bad channel quality can monitor the neighboring cells.

In an embodiment, the cell scanning can be configured by the network. The configuration can be per mobile station RF chain.

In an alternative embodiment, the mobile station determines which RF chain(s) are used to perform cell scanning, and which RF chain(s) are used for data communication. The mobile station then performs autonomous scanning.

In certain embodiments, transceiver configuration changes can be applied when the mobile station allocates resources for cell scanning or for data communication. Such changes can be determined by the mobile station. Alternatively, the network can determine any transceiver changes that should be made in the mobile station in order for the mobile station to have good data communication, as well as to scan other cells (e.g., SCH/BCH). In such a case, the network may instruct the mobile station to change its configuration.

In certain embodiments, a beam forming codebook or codeword change can be applied when the mobile station allocates resources for cell scanning or for data communication. For example, a first codebook can be used for data communication. Then when the mobile station tunes away for cell scanning, a second codebook can be used for data communication.

As another example, instead of a codebook, a codebook limitation (e.g., a subset of the general codebook) change can be applied when the mobile station allocates resources for cell scanning or for data communication. As yet another example, a rank change can be applied when the mobile station allocates resources for cell scanning or for data communication.

In certain embodiments, the method for determining mobile station scanning cells can be dependent on the SCH/BCH configuration. If SCH/BCH beams are concurrently sent and repeated, the monitoring time can be reduced. If SCH/BCH beams are steered, the monitoring time may be a full frame. If both methods are used, the network can configure the mobile station on how to scan. The methods may be limited by the worst case scenario of the SCH/BCH configuration. If the mobile station is in a neighborhood, if the SCH/BCH beams are concurrently sent and repeated for all cells, then the mobile station can be configured in a shorter slot for cell scanning. This method reduces overhead.

In certain embodiments, before the neighboring cell scanning and data communication are configured or reconfigured (e.g., transition from the data communication or from the neighboring cell scanning to concurrent data communication and neighboring cell scanning, transition from the concurrent data communication and neighboring cell scanning to only data communication or to only neighboring cell scanning), or before the configuration or reconfiguration of the neighboring cell scanning and data communication is effective, the BS can inform the MS with the information regarding the change of the configuration of the feedback for channel quality indicator (CQI), channel state indicator (CSI), etc., and the change of the configuration of the BS transmission mode and transmission rank, etc., if needed. The information can include the new configuration of the feedback for CQI or CSI, the new configuration of the BS transmission mode, transmission rank, and the like.

In certain embodiments, the BS transmission mode or the communication configuration can change in the cell scanning period. In expectation of the cell scanning period, the base station and mobile station may change the channel state indicator (CSI) feedback and scheduling grant so that the BS transmission rank and transmission modes at the time of cell scanning are compatible with the available mobile station receiver configuration for the PDSCH (physical downlink shared channel) reception. The base station or the network can configure the configuration and send the configuration to the mobile station, so that the mobile station can follow the configuration. In an alternative embodiment, the mobile station can request the new configuration or suggest a new configuration.

Alternatively, certain mapping of CSI feedback or a fallback of transmission modes should be specified for the mobile station to transition into the cell scanning period while maintaining PDSCH communication. The base station or the network can configure the configuration and send the configuration to the mobile station, so that the mobile station can follow the configuration. In an alternative embodiment, the mobile station can request the new configuration or suggest a new configuration.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A method for scanning cells by a mobile station in a wireless network, wherein the mobile station comprises a plurality of radio frequency (RF) chains, the method comprising:
scanning for one or more neighboring base station cells in a same frequency band as a serving base station cell using one or more receive beams,
wherein the one or more receive beams used for scanning are different than receive beams used for data communication with the serving base station cell; and
using at least one first RF chain for data communication with the serving base station cell and using at least one second RF chain for scanning the one or more neighboring base station cells, wherein the data communication and the cell scanning are concurrent.

2. The method of claim 1, further comprising:
transmitting, to the serving base station, information regarding which receive beams are to be used to scan the one or more neighboring base station cells, the information comprising at least one of: a number of the receive beams to be used to scan, a time that the mobile station needs to scan for base station transmit beams in all directions that the base station is configured, and a minimum time period that the mobile station needs to scan for a base station transmit beams in all directions that the base station is configured; and receiving, from the serving base station, configuration information associated with the scanning, the configuration information comprising at least one of: a time interval pattern, a time interval length, and a number of receive beams to be used for scanning.

3. The method of claim 1, wherein the wireless network is an asynchronous network in which the serving base station and the one or more neighboring base stations are not synchronized, the method further comprising at least one of:
scanning the one or more neighboring base station cells in a spatial region where the data communication with the serving base station is ongoing, and
steering one or more receive beams away from data communication with the serving base station cell in order to scan the one or more neighboring base station cells.

4. The method of claim 1, further comprising at least one of:
using a first codebook for data communication, and when the mobile station tunes away for cell scanning, using a second codebook for data communication; and
using a first set of codewords for data communication, and when the mobile station tunes away for cell scanning, using a second set of codewords for data communication, wherein the two sets of codewords are not disjoint.

5. The method of claim 1, wherein the at least one first RF chain is selected for data communication based on a relatively good channel quality and the at least one second RF chain is selected for scanning based on a relatively bad channel quality.

6. The method of claim 1, further comprising:
receiving, from the serving base station, information regarding a change of at least one of: the configuration of the feedback of channel quality indicator, and the configuration of transmission mode prior to the reconfiguration of the neighboring cell scanning and data communication with the serving base station being effective.

7. An apparatus for use in a mobile station configured to scan cells in a wireless network, the apparatus comprising:
a plurality of radio frequency (RF) chains;
a processor configured to:
scan for one or more neighboring base station cells in a same frequency band as a serving base station cell using one or more receive beams, wherein the one or more receive beams used for scanning are different than receive beams used for data communication with the serving base station cell, and
use at least one first RF chain for data communication with the serving base station cell and use at least one second RF chain for scanning the one or more neighboring base station cells, wherein the data communication and the cell scanning are concurrent.

8. The apparatus of claim 7, the processor further configured to:
transmit, to the serving base station, information regarding which receive beams are to be used to scan the one or more neighboring base station cells, the information comprising at least one of: a number of the receive beams to be used to scan, a time that the mobile station needs to scan for base station transmit beams in all directions that the base station is configured, and a minimum time period that the mobile station needs to scan for a base station transmit beams in all directions that the base station is configured; and
receive, from the serving base station, configuration information associated with the scanning, the configuration information comprising at least one of: a time interval pattern, a time interval length, and a number of receive beams to be used for scanning.

9. The apparatus of claim 7, wherein the wireless network is an asynchronous network in which the serving base station and the one or more neighboring base stations are not synchronized, the processor further configured to at least one of:
scan the one or more neighboring base station cells in a spatial region where the data communication with the serving base station is ongoing, and
steer one or more receive beams away from data communication with the serving base station cell in order to scan the one or more neighboring base station cells.

10. The apparatus of claim 7, wherein the processor is further configured to at least one of:
use a first codebook for data communication, and when the mobile station tunes away for cell scanning, use a second codebook for data communication; and
use a first set of codewords for data communication, and when the mobile station tunes away for cell scanning, use a second set of codewords for data communication, wherein the two sets of codewords are not disjoint.

11. The apparatus of claim 10, wherein the at least one first RF chain is selected for data communication based on a relatively good channel quality and the at least one second RF chain is selected for scanning based on a relatively bad channel quality.

12. The apparatus of claim 7, the processor further configured to:
receive, from the serving base station, information regarding a change of at least one of: the configuration of the feedback of channel quality indicator, and the configuration of transmission mode prior to the reconfiguration of the neighboring cell scanning and data communication with the serving base station being effective.

13. A method for a serving base station to configure a mobile station to scan cells in a wireless network, wherein the mobile station comprises a plurality of radio frequency (RF) chains, the method comprising:
configuring the mobile station to scan for one or more neighboring base station cells in a same frequency band as a serving base station cell using one or more receive beams,
wherein the one or more receive beams used for scanning are different than receive beams used for data communication with the serving base station cell
configuring the mobile station to use at least one first RF chain for data communication with the serving base station cell and use at least one second RF chain for scanning the one or more neighboring base station cells, wherein the data communication and the cell scanning are concurrent.

14. The method of claim 13, further comprising:
receiving, from the mobile station, information regarding which receive beams are to be used to scan the one or more neighboring base station cells, the information comprising at least one of: a number of the receive beams to be used to scan, a time that the mobile station needs to scan for base station transmit beams in all directions that the base station is configured, and a minimum time period that the mobile station needs to scan for a base station transmit beams in all directions that the base station is configured; and
transmitting, to the mobile station, configuration information associated with the scanning, the configuration information comprising at least one of: a time interval pattern, a time interval length, and a number of receive beams to be used for scanning.

15. The method of claim 13, wherein the wireless network is an asynchronous network in which the serving base station and the one or more neighboring base stations are not synchronized, the method further comprising at least one of:
configuring the mobile station to scan the one or more neighboring base station cells in a spatial region where the data communication with the serving base station is ongoing, and
configuring the mobile station to steer one or more receive beams away from data communication with the serving base station cell in order to scan the one or more neighboring base station cells.

16. The method of claim 13, further comprising at least one of:
configuring the mobile station to use a first codebook for data communication, and when the mobile station tunes away for cell scanning, use a second codebook for data communication; and
configuring the mobile station to use a first set of codewords for data communication, and when the mobile station tunes away for cell scanning, use a second set of codewords for data communication, wherein the two sets of codewords are not disjoint.

17. The method of claim 13, wherein the at least one first RF chain is selected for data communication based on a relatively good channel quality and the at least one second RF chain is selected for scanning based on a relatively bad channel quality.

18. The method of claim 13, further comprising:
transmitting, to the mobile station, information regarding a change of at least one of: the configuration of the feedback of channel quality indicator, and the configuration of transmission mode prior to the reconfiguration of the neighboring cell scanning and data communication with the serving base station being effective.

19. An apparatus for use in a serving base station to configure a mobile station to scan cells in a wireless network, wherein the mobile station comprises a plurality of radio frequency (RF) chains, the apparatus comprising:
a processor configured to:
configure the mobile station to scan for one or more neighboring base station cells in a same frequency band as a serving base station cell using one or more receive beams, wherein the one or more receive beams used for scanning are different than receive beams used for data communication with the serving base station cell, and
configure the mobile station to use at least one first RF chain for data communication with the serving base station cell and use at least one second RF chain for scanning the one or more neighboring base station cells, wherein the data communication and the cell scanning are concurrent.

20. The apparatus of claim 19, the processor further configured to:
receive, from the mobile station, information regarding which receive beams are to be used to scan the one or more neighboring base station cells, the information comprising at least one of: a number of the receive beams to be used to scan, a time that the mobile station needs to scan for base station transmit beams in all directions that the base station is configured, and a minimum time period that the mobile station needs to scan for a base station transmit beams in all directions that the base station is configured; and
transmit, to the mobile station, configuration information associated with the scanning, the configuration information comprising at least one of: a time interval pattern, a time interval length, and a number of receive beams to be used for scanning.

21. The apparatus of claim 19, wherein the wireless network is an asynchronous network in which the serving base station and the one or more neighboring base stations are not synchronized, the processor further configured to at least one of:
configure the mobile station to scan the one or more neighboring base station cells in a spatial region where the data communication with the serving base station is ongoing, and
configure the mobile station to steer one or more receive beams away from data communication with the serving base station cell in order to scan the one or more neighboring base station cells.

22. The apparatus of claim 19, wherein the processor is further configured to at least one of:
configure the mobile station to use a first codebook for data communication, and when the mobile station tunes away for cell scanning, use a second codebook for data communication; and
configure the mobile station to use a first set of codewords for data communication, and when the mobile station tunes away for cell scanning, use a second set of codewords for data communication, wherein the two sets of codewords are not disjoint.

23. The apparatus of claim 19, wherein the at least one first RF chain is selected for data communication based on a relatively good channel quality and the at least one second RF chain is selected for scanning based on a relatively bad channel quality.

24. The apparatus of claim 19, the processor further configured to:
transmit, to the mobile station, information regarding a change of at least one of: the configuration of the feedback of channel quality indicator, and the configuration of transmission mode prior to the reconfiguration of the neighboring cell scanning and data communication with the serving base station being effective.

* * * * *